(12) United States Patent
Obama

(10) Patent No.: US 8,498,065 B2
(45) Date of Patent: Jul. 30, 2013

(54) LENS SYSTEM AND OPTICAL APPARATUS

(75) Inventor: Akihiko Obama, Tokyo (JP)

(73) Assignee: Nikon Corporation, Tokyo (JP)

( * ) Notice: Subject to any disclaimer, the term of this patent is extended or adjusted under 35 U.S.C. 154(b) by 180 days.

(21) Appl. No.: 13/002,325

(22) PCT Filed: Jun. 25, 2009

(86) PCT No.: PCT/JP2009/062076
§ 371 (c)(1),
(2), (4) Date: Dec. 31, 2010

(87) PCT Pub. No.: WO2010/001943
PCT Pub. Date: Jan. 7, 2010

(65) Prior Publication Data
US 2011/0096416 A1    Apr. 28, 2011

(30) Foreign Application Priority Data

Jul. 2, 2008  (JP) .................................. 2008-173690
Jul. 2, 2008  (JP) .................................. 2008-173700
Sep. 18, 2008  (JP) .................................. 2008-239916

(51) Int. Cl.
*G02B 9/04*  (2006.01)
*G02B 9/14*  (2006.01)

(52) U.S. Cl.
USPC ........................................ 359/793; 359/785

(58) Field of Classification Search
USPC ........................................ 359/784, 785, 793
See application file for complete search history.

(56) References Cited

U.S. PATENT DOCUMENTS

| 4,390,250 A | 6/1983 | Imai |
| 6,636,364 B2 | 10/2003 | Sato |
| 2002/0048091 A1 | 4/2002 | Sato |
| 2005/0286138 A1 | 12/2005 | Matsusaka |

FOREIGN PATENT DOCUMENTS

| JP | 57-30814 | 2/1982 |
| JP | 2002-131631 | 5/2002 |
| JP | 2006-11096 A | 1/2006 |
| JP | 2006-11096 A | 1/2006 |
| JP | 2007-304224 A | 11/2007 |
| JP | 2007-333790 | 12/2007 |
| JP | 2007-333790 A | 12/2007 |
| JP | 2008-008960 A | 1/2008 |

OTHER PUBLICATIONS

English version of International Preliminary Report on Patentability issued Feb. 8, 2011, in International Patent Application No. PCT/JP2009/062076.

*Primary Examiner* — William Choi
(74) *Attorney, Agent, or Firm* — Miles & Stockbridge P.C.

(57) ABSTRACT

A lens system comprising, in order from an object side: a first lens group G1; and a second lens group G2 having positive refractive power; the first lens group G1 including a sub-lens group GS11 having positive refractive power, and a sub-lens group GS12 having negative refractive power, the sub-lens group GS12 having negative refractive power including a meniscus lens having a convex surface facing the object side, given conditions being satisfied, thereby providing a lens system having high optical performance with excellently correcting various aberrations, and an optical apparatus equipped therewith.

23 Claims, 21 Drawing Sheets

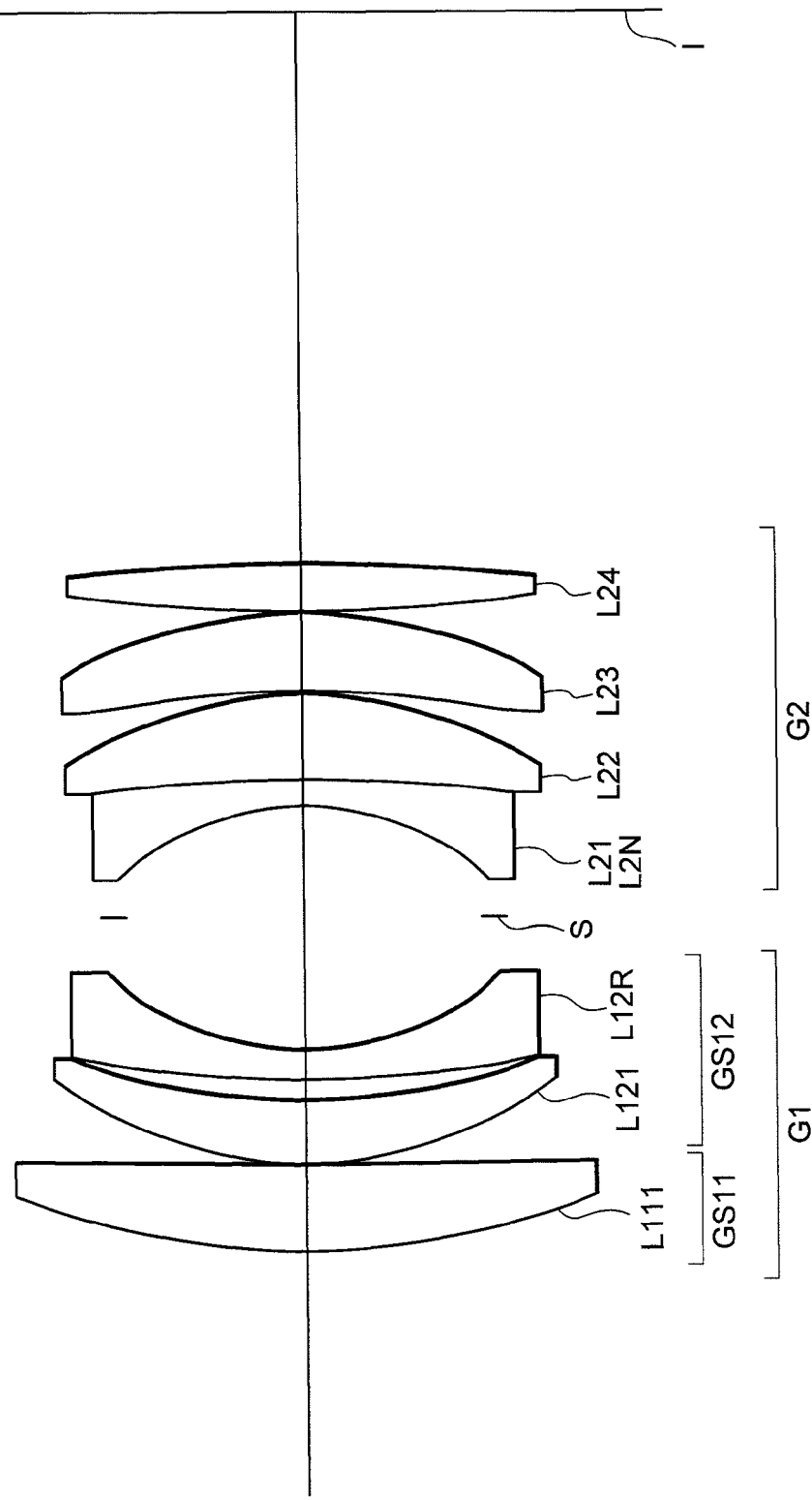

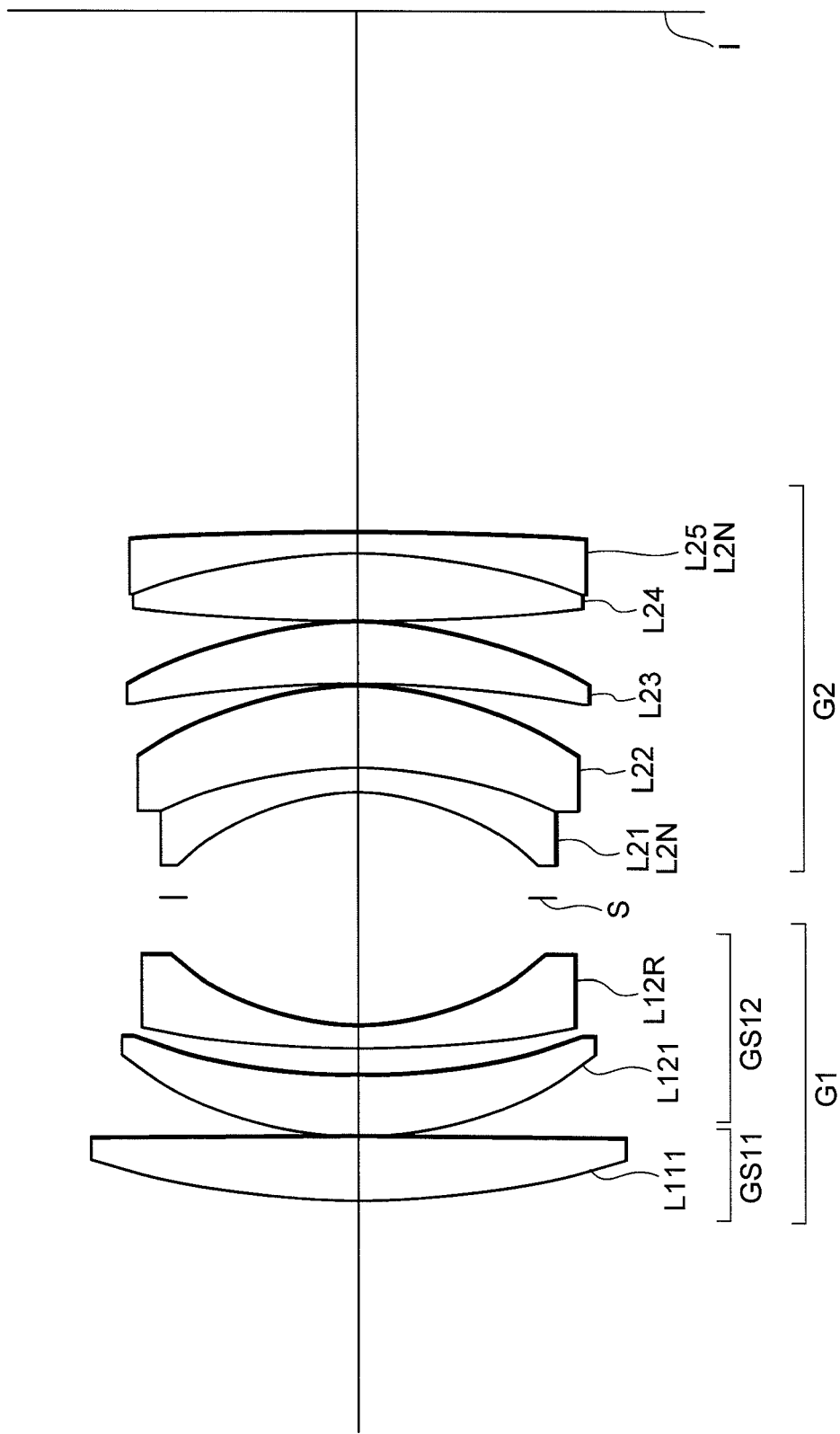

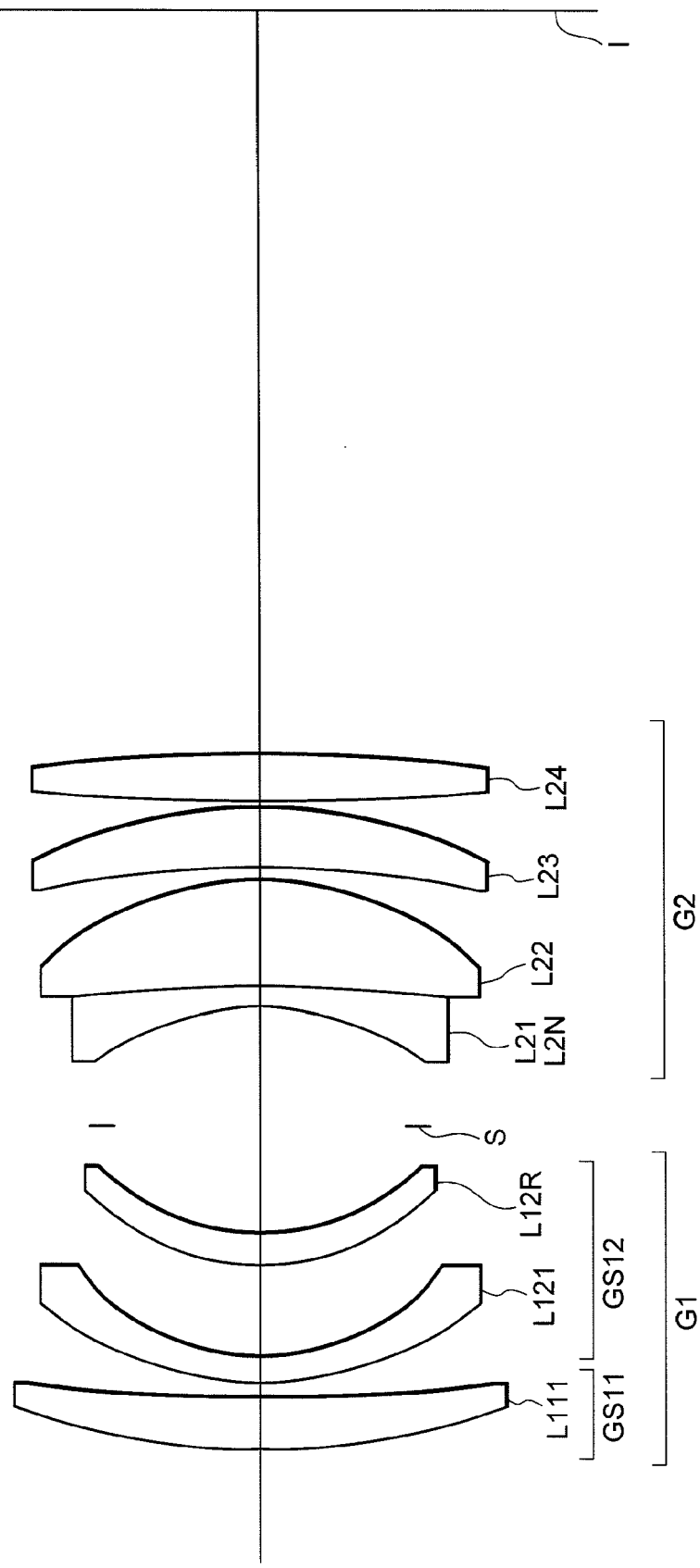

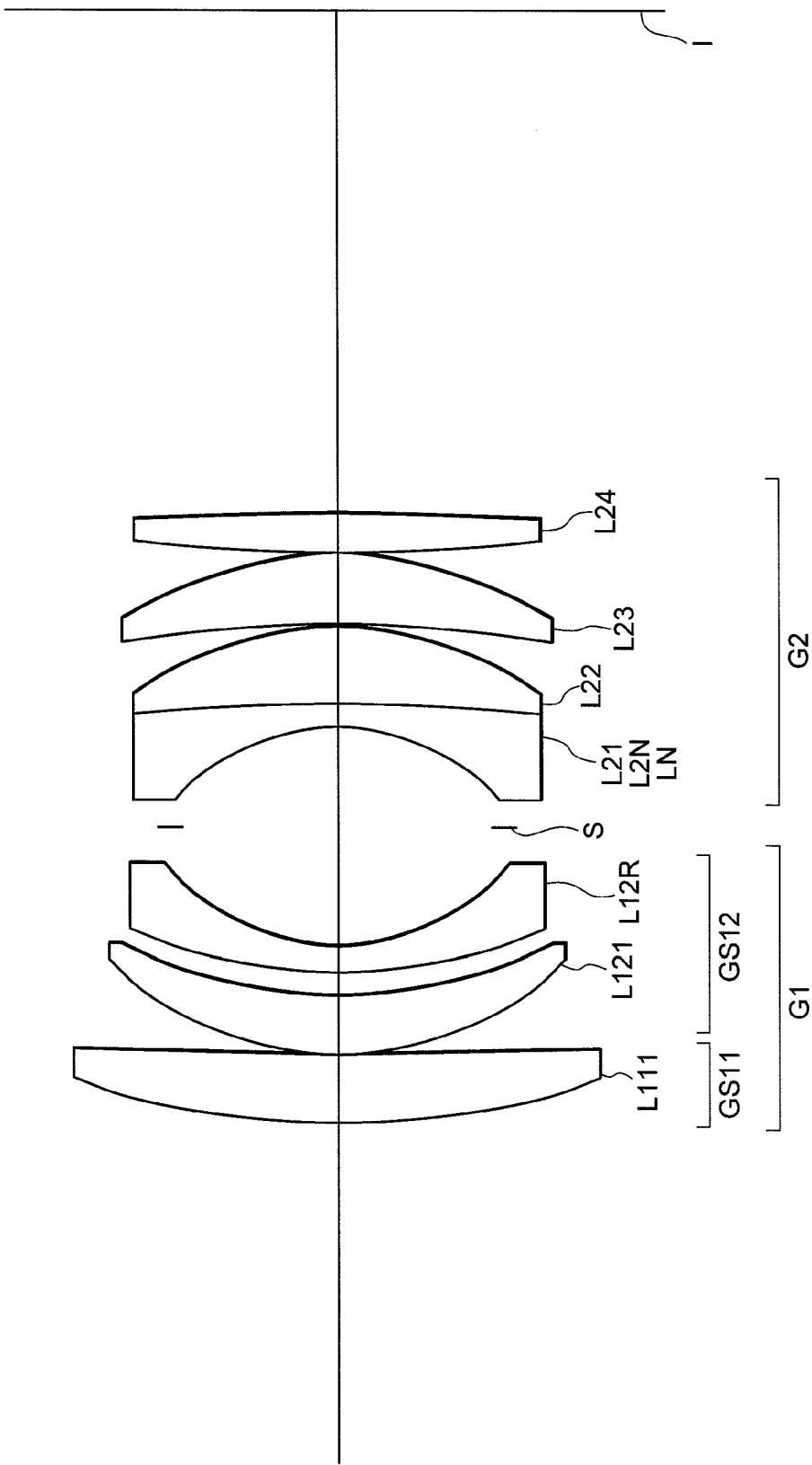

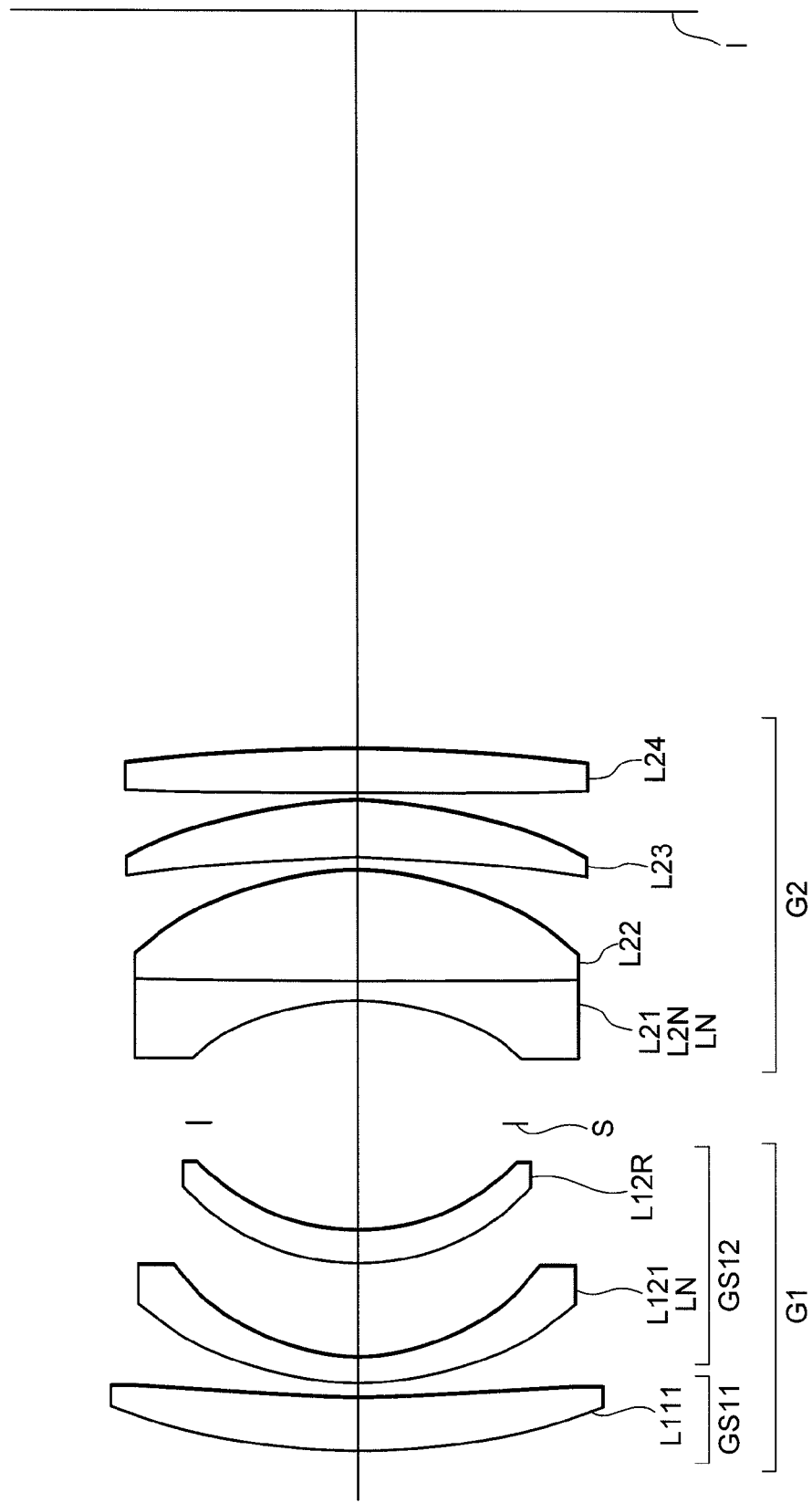

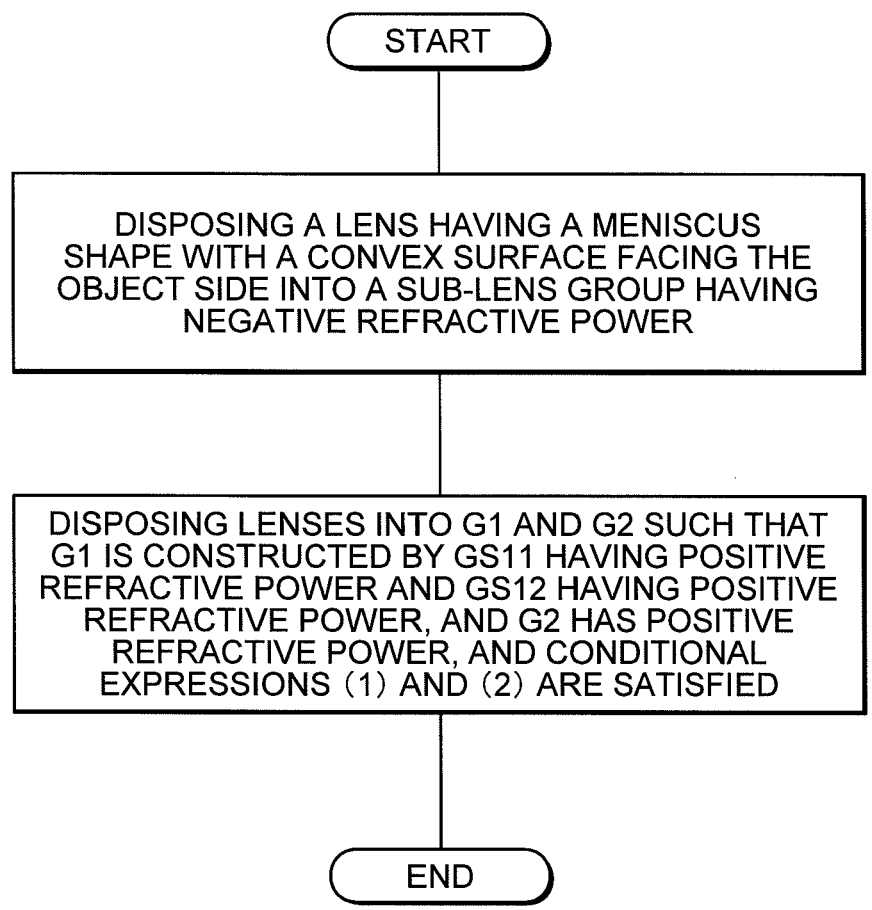

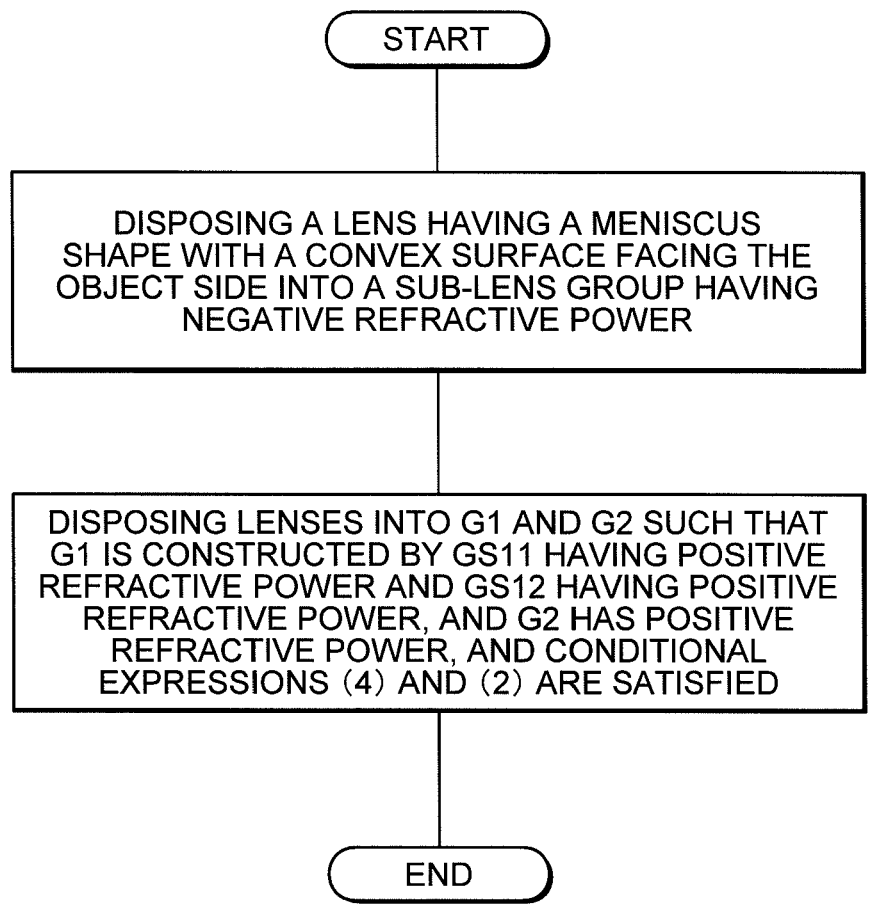

LENS SYSTEM AND OPTICAL APPARATUS

TECHNICAL FIELD

The present invention relates to a lens system suitable for an interchangeable lens for a single-lens reflex camera and a photocopy lens, and an optical apparatus equipped with the lens system.

BACKGROUND ART

A so-called double-Gauss type lens system has been used as a lens system used for an interchangeable lens for a single-lens reflex camera and a photocopy lens, and a lot of lens systems have been proposed in such as Japanese Patent Application Laid-Open No. 2007-333790.

However, a conventional double-Gauss type lens system generates large coma, so that it does not have sufficiently high optical performance.

DISCLOSURE OF THE INVENTION

The present invention is made in view of the above-described problem, and has an object to provide a lens system capable of accomplishing excellent optical performance.

According to a first aspect of the present invention, there is provided a lens system comprising, in order from an object side: a first lens group; and a second lens group having positive refractive power; the first lens group including a sub-lens group having positive refractive power, and a sub-lens group having negative refractive power, the sub-lens group having negative refractive power including a meniscus lens having a convex surface facing the object side, the following conditional expressions being satisfied:

$1.910 < ndh$ $-0.400 < f/f1 < 0.500$ where ndh denotes a refractive index at d-line (wavelength=587.6 nm) of a lens having the highest refractive index at d-line composing the lens system, f1 denotes a focal length of the first lens group, and f denotes a focal length of the lens system.

According to a second aspect of the present invention, there is provided an optical apparatus equipped with the lens system according to the first aspect.

According to a third aspect of the present invention, there is provided a lens system comprising, in order from an object side: a first lens group; and a second lens group having positive refractive power; the first lens group including a sub-lens group having positive refractive power, and a sub-lens group having negative refractive power, the sub-lens group having negative refractive power including a meniscus lens having a convex surface facing the object side, the lens system including at least one negative lens satisfying the following conditional expressions:

$1.820 < nNh$ $-0.400 < f/f1 < 0.500$ where nNh denotes a refractive index at d-line (wavelength=587.6 nm) of the negative lens, f1 denotes a focal length of the first lens group, and f denotes a focal length of the lens system.

According to a fourth aspect of the present invention, there is provided an optical apparatus equipped with the lens system according to the third aspect.

According to a fifth aspect of the present invention, there is provided a lens system comprising, in order from an object side: a first lens group; and a second lens group having positive refractive power; the first lens group including a sub-lens group having positive refractive power, and a sub-lens group having negative refractive power, the sub-lens group having negative refractive power including a meniscus lens having a convex surface facing the object side, the following conditional expressions being satisfied:

$1.890 < n2dh$ $-0.400 < f/f1 < 0.500$ where n2dh denotes a refractive index at d-line (wavelength=587.6 nm) of a lens having the highest refractive index at d-line composing the second lens group, f1 denotes a focal length of the first lens group, and f denotes a focal length of the lens system.

According to a sixth aspect of the present invention, there is provided a method for manufacturing a lens system including, in order from an object side along an optical axis, a first lens group and a second lens group including steps of: disposing a meniscus lens having a convex surface facing the object side in a sub-lens group having negative refractive power; disposing the first lens group and the second lens group in such a manner that the first lens group consists of a sub-lens group having positive refractive power and the sub-lens group having negative refractive power, and the second lens group has positive refractive power with satisfying the following conditional expressions:

$1.910 < ndh$ $-0.400 < f/f1 < 0.500$ where ndh denotes a refractive index at d-line (wavelength=587.6 nm) of a lens having the highest refractive index at d-line composing the lens system, f1 denotes a focal length of the first lens group, and f denotes a focal length of the lens system.

According to a seventh aspect of the present invention, there is provided a method for manufacturing a lens system including, in order from an object side along an optical axis, a first lens group and a second lens group including steps of: disposing a meniscus lens having a convex surface facing the object side in a sub-lens group having negative refractive power; disposing the first lens group and the second lens group in such a manner that the first lens group consists of a sub-lens group having positive refractive power and the sub-lens group having negative refractive power, the second lens group has positive refractive power, and the following conditional expressions are satisfied:

$1.820 < nNh$ $-0.400 < f/f1 < 0.500$ where nNh denotes a refractive index at d-line (wavelength=587.6 nm) of a negative lens composing the lens system, f1 denotes a focal length of the first lens group, and f denotes a focal length of the lens system.

The present invention makes it possible to provide a lens system having high optical performance with excellently correcting various aberrations, and an optical apparatus equipped with the lens system.

BRIEF DESCRIPTION OF THE DRAWINGS

FIGS. 2A and 2B are graphs showing various aberrations of the lens system according to Example 1, in which FIG. 2A shows upon focusing on infinity (β=0.0), and FIG. 2B shows upon focusing on a close object (β=−1/30).

FIG. 3 is a sectional view showing a lens configuration of a lens system according to Example 2.

FIGS. 4A and 4B are graphs showing various aberrations of the lens system according to Example 2, in which FIG. 4A shows upon focusing on infinity (β=0.0), and FIG. 4B shows upon focusing on a close object (β=−1/30).

FIGS. 6A and 6B are graphs showing various aberrations of the lens system according to Example 3, in which FIG. 6A shows upon focusing on infinity (β=0.0), and FIG. 6B shows upon focusing on a close object (β=−1/30).

FIGS. 8A and 8B are graphs showing various aberrations of the lens system according to Example 4, in which FIG. 8A shows upon focusing on infinity (β=0.0), and FIG. 8B shows upon focusing on a close object (β=−1/30).

FIG. 9 is a sectional view showing a lens configuration of a lens system according to Example 5.

FIGS. 10A and 10B are graphs showing various aberrations of the lens system according to Example 5, in which FIG. 10A shows upon focusing on infinity (β=0.0), and FIG. 10B shows upon focusing on a close object (β=−1/30).

FIG. 11 is a sectional view showing a lens configuration of a lens system according to Example 6.

FIGS. 12A and 12B are graphs showing various aberrations of the lens system according to Example 6, in which FIG. 12A shows upon focusing on infinity (β=0.0), and FIG. 12B shows upon focusing on a close object (β=−1/30).

FIGS. 14A and 14B are graphs showing various aberrations of the lens system according to Example 7, in which FIG. 14A shows upon focusing on infinity (β=0.0), and FIG. 14B shows upon focusing on a close object (β=−1/30).

FIG. 15 is a sectional view showing a lens configuration of a lens system according to Example 8.

FIGS. 16A and 16B are graphs showing various aberrations of the lens system according to Example 8, in which FIG. 16A shows upon focusing on infinity (β=0.0), and FIG. 16B shows upon focusing on a close object (β=−1/30).

FIG. 17 is a sectional view showing a lens configuration of a lens system according to Example 9.

FIGS. 18A and 18B are graphs showing various aberrations of the lens system according to Example 9, in which FIG. 18A shows upon focusing on infinity (β=0.0), and FIG. 18B shows upon focusing on a close object (β=−1/30).

FIG. 20 is a flowchart schematically explaining a method for manufacturing the lens system according to the present embodiment.

FIG. 21 is a flowchart schematically explaining a method for manufacturing the lens system according to the present embodiment seen from another point of view.

EMBODIMENT FOR CARRYING OUT THE INVENTION

Figure 1:
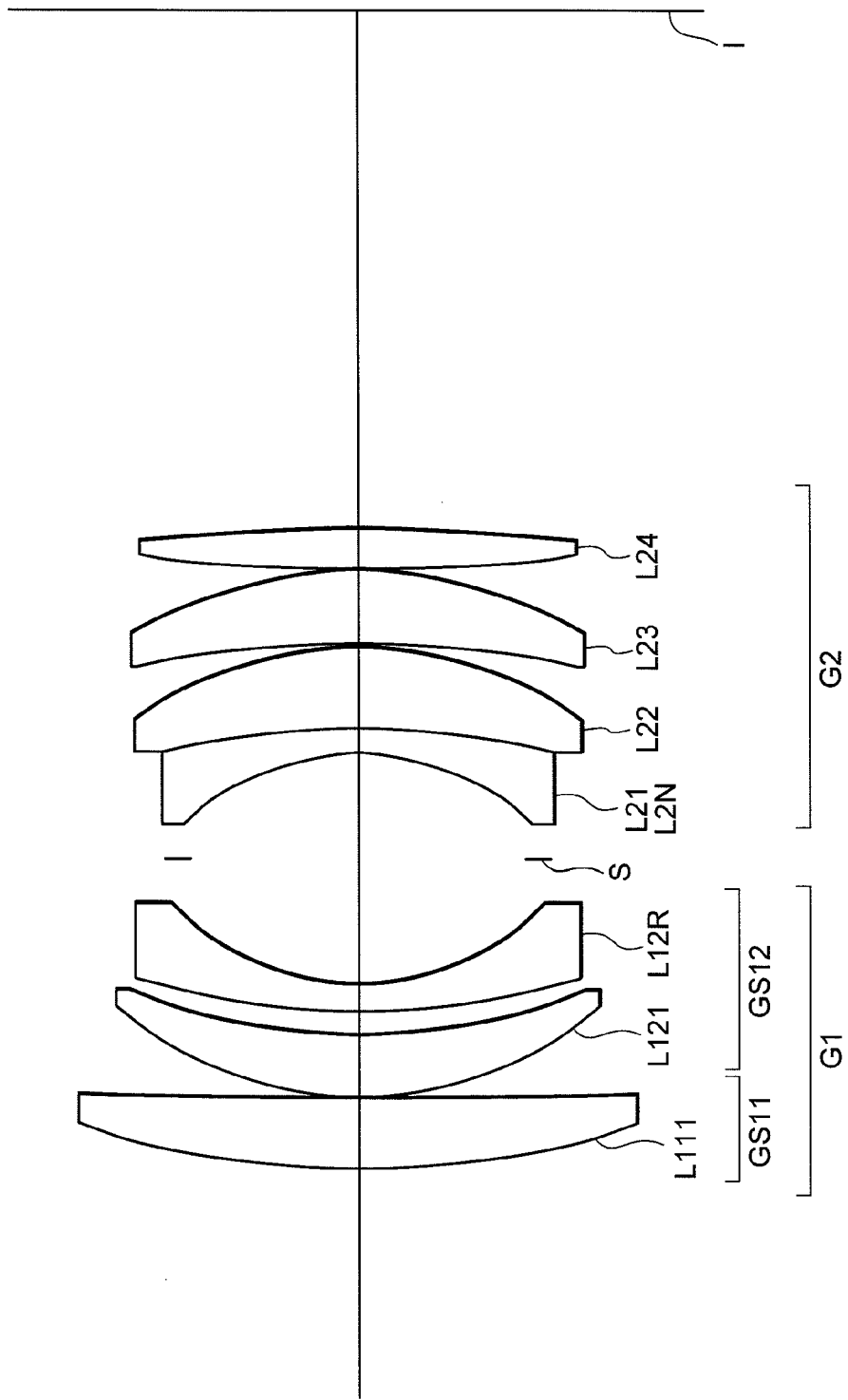
FIG. 1 is a sectional view showing a lens configuration of a lens system according to Example 1.

A lens system according to an embodiment of the present application is explained below.

A lens system according to the present embodiment includes, in order from an object side along an optical axis, a first lens group, and a second lens group having positive refractive power. In the lens system, the first lens group is composed of, in order from the object side, a sub-lens group having positive refractive power, and a sub-lens group having negative refractive power. The sub-lens group having negative refractive power includes a meniscus lens having a convex surface facing the object side. With this lens configuration, it becomes possible to realize so-called double-Gauss type refractive power distribution and to excellently correct distortion and lateral chromatic aberration as well as spherical aberration and curvature of field.

In a lens system according to the present embodiment, the following conditional expressions (1) and (2) are satisfied:

$$1.910 < ndh \quad (1)$$

$$-0.40 < f/f1 < 0.5 \quad (2)$$

where ndh denotes a refractive index at d-line (wavelength=587.6 nm) of a lens having highest refractive index at d-line composing the lens system, and f1 denotes a focal length of the first lens group, and f denotes a focal length of the lens system.

Conditional expression (1) is a condition for excellently correcting spherical aberration and sagittal coma generated in the lens system to obtain high optical performance.

When the value ndh falls below the lower limit of conditional expression (1), there are two cases. One is a case that the lens having highest refractive power at d-line is a positive lens, and the other is a case that the lens is a negative lens.

In the former case, since negative spherical aberration generated in the lens system becomes excessively large, in order to correct the aberration curvature of the negative lens is made large, in other words, the radius of curvature is made small. Accordingly, sagittal coma is generated excessively by the negative lens. In the latter case, sagittal coma is excessively generated by the negative lens. In either case, higher optical performance cannot be obtained.

In order to secure the effect of the present embodiment, it is preferable to set the lower limit of conditional expression (1) to 1.940. In order to secure the effect of the present embodiment, it is preferable to set the value lower than 2.800. With setting the value ndh lower than 2.800, the lens system can be constructed with sufficiently securing transmittance in visible light of the optical material having the highest refractive power in the lens system.

Conditional expression (2) is for obtaining high optical performance with excellently correcting distortion and lateral chromatic aberration generated in the lens system.

When the ratio f/f1 falls below the lower limit of conditional expression (2), refractive power of the first lens group becomes excessively large in negative direction. Accordingly, negative distortion and lateral chromatic aberration become difficult to be corrected, so that high optical performance cannot be obtained.

On the other hand, when the ratio f/f1 exceeds the upper limit of conditional expression (2), it becomes difficult to correct positive distortion generated in the first lens group, and high optical performance cannot be obtained.

In order to secure the effect of the present embodiment, it is preferable to set the lower limit of conditional expression (2) to −0.250. In order to further secure the effect of the present embodiment, it is most preferable to set the lower limit of conditional expression (2) to −0.100. In order to further secure the effect of the present embodiment, it is most preferable to set the lower limit of conditional expression (2) to 0.000. In order to still further secure the effect of the present embodiment, it is most preferable to set the lower limit of conditional expression (2) to 0.100. In order to secure the effect of the present embodiment, it is preferable to set the upper limit of conditional expression (2) to 0.400. In order to further secure the effect of the present embodiment, it is most preferable to set the upper limit of conditional expression (2) to 0.360.

In a lens system according to the present embodiment, the first lens group is preferably composed of, in order from the object side along the optical axis, a sub-lens group having positive refractive power, and a sub-lens group having negative refractive power.

With this configuration, it becomes possible to excellently correct distortion and lateral chromatic aberration.

In a lens system according to the present embodiment, an aperture stop is preferably disposed between the first lens group and the second lens group.

With this configuration, it becomes possible to excellently correct distortion and lateral chromatic aberration.

In a lens system according to the present embodiment, the sub-lens group having positive refractive power includes a lens element having positive refractive power disposed to the most object side, and in the lens element, an absolute value of a radius of curvature of an object side surface is preferably smaller than an absolute value of a radius of curvature of an image side surface.

With this configuration, it becomes possible to gradually bend light ray proceeding toward the center of the image by the lens element. As a result, aberrations generated in the lens element, in particular, generation of spherical aberration can be suppressed, so that high optical performance can be obtained.

Incidentally, a lens element in the present application is a generic name of a single lens and a cemented lens.

In a lens system according to the present embodiment, the sub-lens group having positive refractive power is preferably composed of only a positive lens element.

With this configuration, the number of lenses composing the lens system can be reduced, flare caused by reflections from lens surfaces can be mitigated, and high optical performance can be realized.

In a lens system according to the present embodiment, the following conditional expression (3) is preferably satisfied:

$$24.0 < \nu dh \qquad (3)$$

where νdh denotes an Abbe number at d-line of a lens having the highest refractive index at d-line.

Conditional expression (3) is for obtaining high optical performance with suppressing chromatic aberration.

When the value νdh falls below the lower limit of conditional expression (3), and when the lens having highest refractive index at d-line is a positive lens, correction of chromatic aberration becomes insufficient. When the lens having highest refractive index at d-line is a negative lens, correction of chromatic aberration becomes excessive, in either cases high optical performance cannot be obtained.

In order to secure the effect of the present embodiment, it is preferable to set the lower limit of conditional expression (3) to 25.0. In order to further secure the effect of the present embodiment, it is preferable to set the upper limit of conditional expression (3) to 30.0. With setting νdh smaller than 30.0, it becomes possible to excellently correct chromatic difference in spherical aberration, so that high optical performance can be obtained.

In a lens system according to the present embodiment, the lens system preferably includes at least one lens having negative refractive power that satisfies the following conditional expression (4):

$$1.820 < nNh \qquad (4)$$

where nNh denotes a refractive index at d-line (wavelength=587.6 nm) of the negative lens.

Conditional expression (4) is for obtaining high optical performance with excellently correcting spherical aberration and sagittal coma generated in the lens system.

When the value nNh falls below the lower limit of conditional expression (4), sagittal coma is excessively generated in the negative lens, so that high optical performance cannot be obtained.

In order to secure the effect of the present embodiment, it is preferable to set the lower limit of conditional expression (4) to 1.840. In order to further secure the effect of the present embodiment, it is most preferable to set the lower limit of conditional expression (4) to 1.860. In order to secure the effect of the present embodiment, it is preferable to set the upper limit of conditional expression (4) to 2.80. With setting nNh smaller than 2.800, it becomes possible to sufficiently secure transmittance in visible light range of the optical material of the negative lens.

In a lens system according to the present embodiment, the most image side lens of the sub-lens group having negative refractive power is preferably a lens with negative refractive power having a concave surface facing the image side.

In a lens system according to the present embodiment, the first lens group is composed of the sub-lens group having positive refractive power and the sub-lens group having negative refractive power. Negative spherical aberration generated in the sub-lens group having positive refractive power comes to be excellently corrected by composing the most image side in the sub-lens group having negative refractive power with the lens with negative refractive power having a concave surface facing the image side, so that generation of spherical aberration can be suppressed in low level by the whole of the first lens group. Moreover, coma can be corrected at the same time, so that high optical performance can be obtained as a whole of the lens system.

In a lens system according to the present embodiment, the second lens group preferably includes at least one negative lens having a concave surface facing the object side, and the following conditional expression (5) is preferably satisfied:

$$0.300 < |r2Na|/f < 0.600 \qquad (5)$$

where r2Na denotes a radius of curvature of the object side surface of the at least one negative lens.

Conditional expression (5) is for realizing high optical performance with suppressing sagittal coma.

When the ratio |r2Na|/f falls below the lower limit of conditional expression (5), it becomes difficult to excellently correct negative spherical aberration generated in the second lens group. Moreover, upon focusing from infinity to a close range by the lens system, or upon changing magnification by a projection apparatus or a photocopy machine equipped with a lens system according to the present embodiment, variation in aberrations becomes excessively large, so that high optical performance cannot be secured from infinity to a close range or over broad magnification range.

In order to secure the effect of the present embodiment, it is preferable to set the lower limit of conditional expression (5) to 0.320. In order to secure the effect of the present embodiment, it is preferable to set the upper limit of conditional expression (5) to 0.530.

In a lens system according to the present embodiment, the at least one negative lens having a concave surface facing the object side is preferable disposed to the most object side in the second lens group.

With disposing at least on negative lens having a concave surface facing the object side to the most object side in the second lens group, it becomes possible to obtain high optical performance with suppressing distortion and lateral chromatic aberration generated in the negative lens In a lens system according to the present embodiment, the following conditional expression (6) is preferably satisfied:

$$0.800 < |r2a|/r1b < 1.200 \qquad (6)$$

where r1b denotes a radius of curvature of the most image side lens surface of the first lens group, and r2a denotes a radius of curvature of the most object side lens surface of the second lens group.

Conditional expression (6) is for realizing high optical performance with suppressing sagittal coma.

When the ratio $|r2a|/r1b$ falls below the lower limit of conditional expression (6), in other words, when the curvature of the most object side lens surface of the second lens group becomes excessively large with respect to the curvature of the most image side lens surface of the first lens group, sagittal coma is excessively generated on the object side surface of the second lens group, so that high optical performance cannot be realized.

When the ratio $|r2a|/r1b$ exceeds the upper limit of conditional expression (6), in other words, when the curvature of the most image side lens surface of the first lens group becomes excessively large with respect to the curvature of the most object side lens surface of the second lens group, sagittal coma is excessively generated on the image side surface of the first lens group, so that high optical performance cannot be realized.

In order to secure the effect of the present embodiment, it is preferable to set the lower limit of conditional expression (6) to 0.900. In order to secure the effect of the present embodiment, it is preferable to set the upper limit of conditional expression (6) to 1.150. In order to further secure the effect of the present embodiment, it is most preferable to set the upper limit of conditional expression (6) to 1.100.

In a lens system according to the present embodiment, the following conditional expression (7) is preferably satisfied:

$$0.600 < Bf/f < 1.00 \qquad (7)$$

where Bf denotes a distance along an optical axis between the most image side lens surface of the lens system and the image plane.

Conditional expression (7) is for realizing high optical performance.

When the ratio Bf/f falls below the lower limit of conditional expression (7), the back focal length becomes relatively short with respect to the focal length of the lens system, power distribution of the lens system becomes largely away from a symmetrical type, and it becomes difficult to correct distortion, so that high optical performance cannot be realized.

On the other hand, when the ratio Bf/f exceeds the upper limit of conditional expression (7), the back focal length becomes relatively long with respect to the focal length of the lens system, power distribution of the lens system becomes largely away from a symmetrical type, and it becomes difficult to correct distortion, so that high optical performance cannot be realized.

In order to secure the effect of the present embodiment, it is preferable to set the lower limit of conditional expression (7) to 0.650. In order to further secure the effect of the present embodiment, it is most preferable to set the lower limit of conditional expression (7) to 0.700. In order to secure the effect of the present embodiment, it is preferable to set the upper limit of conditional expression (7) to 0.850. In order to further secure the effect of the present embodiment, it is most preferable to set the upper limit of conditional expression (7) to 0.800.

Incidentally, when a plane parallel plate is inserted between the most image side lens surface and the image plane, Bf is an equivalent air thickness.

In a lens system according to the present embodiment, a distance between the first lens group and the second lens group is preferably always fixed.

With this configuration, it becomes possible to move the first lens group and the second lens group in a body upon focusing from infinity to a close range or upon changing magnification by a projection apparatus or a photocopy machine equipped with a lens system according to the present embodiment, so that generation of decentering coma generated by decentering the first lens group and the second lens group can be suppressed in comparison with a case that the first lens group and the second lens group are moves separately. Accordingly, high optical performance can be realized from infinity to a close range or over broad range of a variable magnification range Then, a lens system according to the present embodiment seen from another point of view includes, in order from an object side along an optical axis, a first lens group, and a second lens group having positive refractive power. The first lens group is composed of a sub-lens group having positive refractive power, and a sub-lens group having negative refractive power. The sub-lens group having negative refractive power includes a meniscus lens having a convex surface facing the object side. With this lens configuration, it becomes possible to realize a so-called double-Gauss type refractive power distribution and to excellently correct distortion and lateral chromatic aberration as well as spherical aberration and curvature of field.

Moreover, in a lens system according to the present embodiment seen from another point of view, the lens system includes at least one negative lens that satisfies the following conditional expression (4), and the following conditional expressions (4) and (2) are satisfied:

$$1.820 < nNh \qquad (4)$$

$$-0.400 < f/f1 < 0.500 \qquad (2)$$

where nNh denotes a refractive index at d-line (wavelength=587.6 nm) of the negative lens, and f1 denotes a focal length of the first lens group, and f denotes a focal length of the lens system.

Conditional expression (4) is for obtaining high optical performance with excellently correcting spherical aberration and sagittal coma generated in the lens system. However, conditional expression (4) has already explained above, so that duplicated explanations are omitted.

Conditional expression (2) is for obtaining high optical performance with excellently correcting distortion and lateral chromatic aberration generated in the lens system. However, conditional expression (2) has already explained above, so that duplicated explanations are omitted.

In a lens system according to the present embodiment seen from another point of view, the following conditional expression (8) is preferably satisfied:

$$12.0 < vdN < 24.0 \qquad (8)$$

where vdN denotes an Abbe number at d-line of the negative lens.

Conditional expression (8) is for obtaining high optical performance with suppressing chromatic aberration.

When the value vdN falls below the lower limit of conditional expression (8), chromatic variation in spherical aberration is corrected excessively, so that high optical performance cannot be obtained. On the other hand, when the value vdN exceeds the upper limit of conditional expression (8), chromatic variation in spherical aberration is corrected insufficiently, so that high optical performance cannot be obtained.

In order to secure the effect of the present embodiment, it is preferable to set the lower limit of conditional expression (8) to 16.0. In order to further secure the effect of the present embodiment, it is most preferable to set the lower limit of conditional expression (8) to 18.0.

In a lens system according to the present embodiment seen from another point of view, the negative lens preferably has a meniscus shape.

With this configuration, it becomes possible to obtain excellent optical performance with suppressing generation of coma.

In a lens system according to the present embodiment seen from another point of view, the negative lens is preferably disposed to the most object side in the second lens group, and the object side surface of the negative lens is preferably a concave surface facing the object side.

With this configuration, it becomes possible to suppress generation of coma, in particular, sagittal coma to obtain high optical performance.

In a lens system according to the present embodiment seen from another point of view, the negative lens is preferably disposed to the most image side in the first lens group, and the image side surface of the negative lens is preferably a concave surface facing the image side.

With this configuration, it becomes possible to suppress generation of coma, in particular, sagittal coma to obtain high optical performance.

Then, a lens system according to the present embodiment seen from still another point of view is explained.

A lens system according to the present embodiment seen from still another point of view includes, in order from an object along an optical axis, a first lens group and a second lens group having positive refractive power. The first lens group is composed of a sub-lens group having positive refractive power, and a sub-lens group having negative refractive power. The sub-lens group having negative refractive power includes a lens having a meniscus shape with a convex surface facing the object side. With this lens configuration, it becomes possible to realize a so-called double-Gauss type refractive power distribution and to excellently correct distortion and lateral chromatic aberration as well as spherical aberration and curvature of field.

In a lens system according to the present embodiment seen from still another point of view, the following conditional expressions (9) and (2) are satisfied:

$$1.890 < n2dh \quad (9)$$

$$-0.400 < f/f1 < 0.500 \quad (2)$$

where $n2dh$ denotes a refractive index at d-line (wavelength=587.6 nm) of a lens having the highest refractive index at d-line composing the second lens group, f1 denotes a focal length of the first lens group, and f denotes a focal length of the lens system.

Conditional expression (9) is for obtaining high optical performance with excellently correcting spherical aberration and sagittal coma generated in the lens system.

When the value $n2dh$ falls below the lower limit of conditional expression (9), there are two cases that the lens having highest refractive index at d-line is a positive lens, and the lens is a negative lens.

In the former case, negative spherical aberration generated in the lens system becomes excessively large. In order to correct it, refractive power of the negative lens in the lens system is made large, in other words, the radius of curvature is made small, so that sagittal coma is excessively generated by the negative lens. In the latter case, sagittal coma is excessively generated by the negative lens. Accordingly, in either case, high optical performance cannot be obtained.

In order to secure the effect of the present embodiment, it is preferable to set the lower limit of conditional expression (9) to 1.900. In order to further secure the effect of the present embodiment, it is most preferable to set the lower limit of conditional expression (9) to 1.910. In order to still further secure the effect of the present embodiment, it is most preferable to set the lower limit of conditional expression (9) to 1.940. In order to secure the effect of the present embodiment, it is preferable to set the value $n2dh$ smaller than 2.800. With setting the value $n2dh$ smaller than 2.800, the lens system can be constructed with sufficiently securing transmittance in visible light of the optical material having the highest refractive power at d-line in the second lens group.

Conditional expression (2) is for obtaining high optical performance with excellently correcting distortion and lateral chromatic aberration generated in the lens system. However, conditional expression (2) has already explained above, so that duplicated explanations are omitted.

In a lens system according to the present embodiment seen from still another point of view, the following conditional expression (6A) is preferably satisfied:

$$0.750 < |r2a|/r1b < 1.250 \quad (6A)$$

where r1b denotes a radius of curvature of the most image side lens surface in the first lens group, and r2a denotes a radius of curvature of the most object side lens surface in the second lens group.

Conditional expression (6A) is for realizing high optical performance with suppressing sagittal coma.

When the ratio $|r2a|/r1b$ falls below the lower limit of conditional expression (6A), in other words, when the curvature of the most object side lens surface of the second lens group becomes excessively large with respect to the curvature of the most image side lens surface of the first lens group, sagittal coma is excessively generated on the object side surface of the second lens group, so that high optical performance cannot be realized.

When the ratio $|r2a|/r1b$ exceeds the upper limit of conditional expression (6A), in other words, when the curvature of the most image side lens surface of the first lens group becomes excessively large with respect to the curvature of the most object side lens surface of the second lens group, sagittal coma is excessively generated on the image side surface of the first lens group, so that high optical performance cannot be realized.

In order to secure the effect of the present embodiment, it is preferable to set the lower limit of conditional expression (6A) to 0.850. In order to secure the effect of the present embodiment, it is preferable to set the upper limit of conditional expression (6A) to 1.220. In order to further secure the effect of the present embodiment, it is most preferable to set the upper limit of conditional expression (6A) to 1.150.

Moreover, any lens surface may be formed as a spherical surface, a plane surface or an aspherical surface.

When a lens surface is a spherical surface or a plane surface, processing and assembly of the lens become easy, so that deterioration of optical performance caused by errors upon processing and assembling can be prevented. Even if the lens surface is shifted, deterioration in optical performance is small, so that it is desirable.

When the lens surface is an aspherical surface, the aspherical surface may be fabricated by a fine grinding process, a glass molding process that a glass material is formed into an aspherical shape by a mold, or a compound type process that a resin material is formed into an aspherical shape on a glass surface. Any lens surface may be a diffractive optical surface. Any lens may be a graded index lens (GRIN lens), or a plastic lens.

Each example according to the present embodiment is explained below with reference to accompanying drawings. Incidentally, a detailed explanation of antireflection coating is separately shown after Examples.

EXAMPLE 1

FIG. 1 is a sectional view showing a lens configuration of a lens system according to Example 1.

The lens system according to Example 1 is composed of, in order from an object side along an optical axis, a first lens group G1 having positive refractive power, and a second lens group G2 having positive refractive power. An aperture stop S is disposed between the first lens group G1 and the second lens group G2.

The first lens group G1 is composed of, in order from the object side along the optical axis, a sub-lens group GS11 having positive refractive power, and a sub-lens group GS12 having negative refractive power. The sub-lens group GS11 is constructed by a positive meniscus lens L111 having a convex surface facing the object side with stronger refractive power than an image side surface. The sub-lens group GS12 is constructed by, in order from the object side along the optical axis, a positive meniscus lens L121 having a convex surface facing the object side with stronger refractive power than the image side surface and a negative meniscus lens L12R having a concave surface facing the image side.

The second lens group G2 is composed of, in order from the object side along the optical axis, a cemented lens constructed by a negative meniscus lens L21 having a concave surface facing the object side cemented with a positive meniscus lens L22 having a concave surface facing the object side with weaker refractive power than the image side surface, a positive meniscus lens L23 having a convex surface facing the image side, and a double convex positive lens L24 disposed to the most image side with stronger refractive power on the object side surface with respect to the image side surface. Light ray come out from the lens L24 forms an image on the image plane I.

Focusing on a close object is carried out by moving the first lens group G1 and the second lens group G2 toward the object side in a body.

Various values associated with the lens system according to Example 1 are listed in Table 1.

In [Specifications], f denotes a focal length of a lens system, FNO denotes an f-number, ω denotes a half angle of view (unit: degree), Y denotes an image height, and TL denotes a total lens length that is a distance between the object side surface of the lens L111 upon focusing infinity and an image plane I.

In [Lens Data], "i" shows optical surface number, "r" shows a radius of curvature of each optical surface (mm), "d" shows a surface distance (mm), "nd" shows a refractive index at d-line (wavelength: 587.56 nm), and "vd" shows an Abbe number at d-line. Incidentally, refractive index of the air nd=1.000000 is omitted, and "r=∞" indicates a plane surface.

In [Variable Distances], INF denotes a state upon focusing on infinity, CLD denotes a state upon focusing on a close object, R denotes a shooting range that is a distance between an object and an image plane I (unit: m), β denotes a shooting magnification, and Bf denotes a back focal length.

In [Values for Conditional Expressions], values for conditional expressions are shown.

In respective tables for various values, "mm" is generally used for the unit of length such as the focal length, the radius of curvature and the distance to the next lens surface. However, since similar optical performance can be obtained by an optical system proportionally enlarged or reduced its dimension, the unit is not necessarily to be limited to "mm", and any other suitable unit can be used. The explanation of reference symbols is the same in the other Examples.

TABLE 1

[Specifications]

f = 51.61
FNO = 1.45
ω = 23.10
Y = 21.60
TL = 85.66

[Lens Data]

| i | r | d | nd | vd |
|---|---|---|---|---|
| 1 | 61.1028 | 5.2000 | 1.834807 | 42.71 |
| 2 | 421.6037 | 0.1000 | | |
| 3 | 26.6848 | 4.5000 | 2.003300 | 28.27 |
| 4 | 42.4965 | 1.8000 | | |
| 5 | 55.6668 | 2.0000 | 1.808090 | 22.79 |
| 6 | 18.6474 | 9.3000 | | |
| 7 | ∞ | 7.7000 | Aperture stop S | |
| 8 | −18.7111 | 1.8000 | 1.846660 | 23.78 |
| 9 | −64.8673 | 6.0000 | 1.788001 | 47.37 |
| 10 | −29.0381 | 0.2000 | | |
| 11 | −90.5334 | 5.5000 | 1.834807 | 42.71 |
| 12 | −33.0755 | 0.1000 | | |
| 13 | 114.2530 | 3.0000 | 1.772499 | 49.60 |
| 14 | −161.9377 | (Bf) | | |

[Variable Distances]

|  | INF | CLD |
|---|---|---|
| R = | ∞ | 1.64 |
| β = | 0.0 | −1/30 |
| Bf = | 38.4641 | 40.1846 |

[Values for Conditional Expressions]

(1) ndh = 2.003300
(2) f/f1 = 0.33461
(3) vdh = 28.27
(4) nNh = 1.846660
(5) |r2Na|/f = 0.36253
(6) |r2a|/r1b = 1.00342
(7) Bf/f = 0.74525
(8) vdN = 23.78

In the lens system according to Example 1, the lens having highest refractive power at d-line is the lens L121. The lens L21 is the negative lens LN satisfying conditional expression (4), and the negative lens L2N having a concave surface facing the object side. Here, the radius of curvature of the object side surface of the lens L21 is r2Na and r2a, and the radius of curvature of the image side surface of the lens L12R is r1b.

Figure 2A:
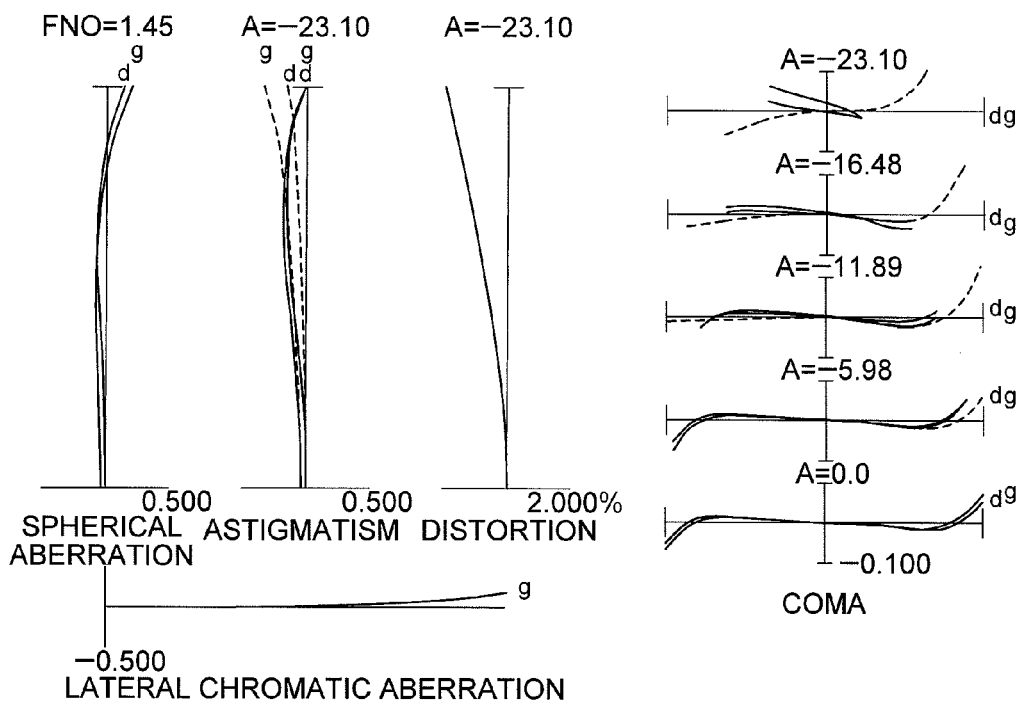
Figure 2B:
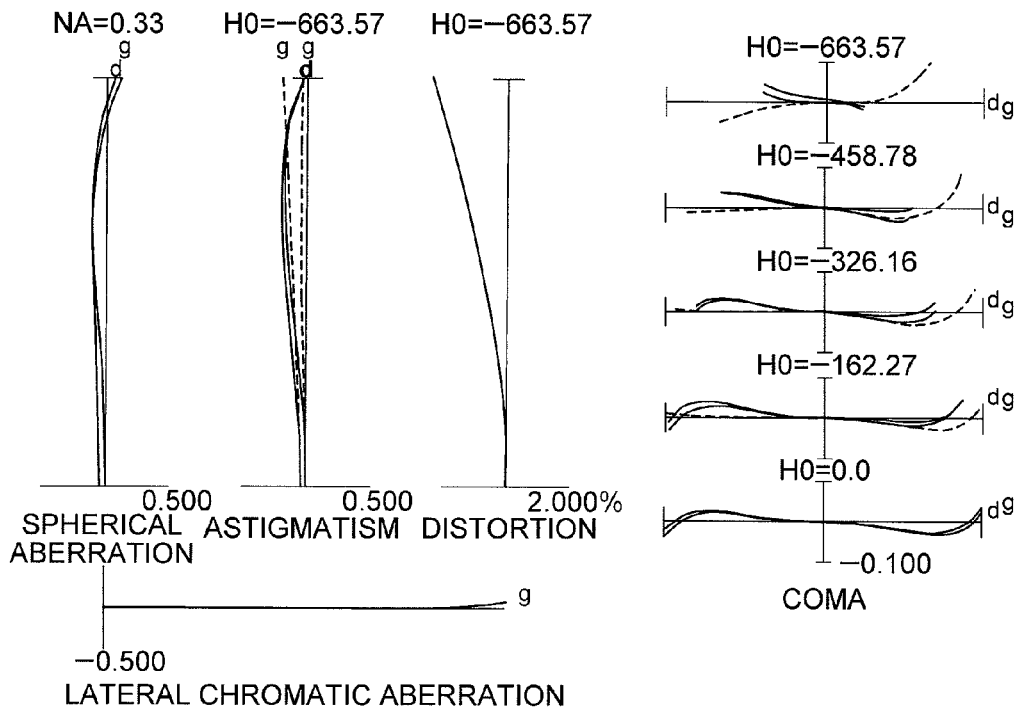

FIGS. 2A and 2B are graphs showing various aberrations of the lens system according to Example 1, in which FIG. 2A shows upon focusing on infinity (β=0.0), and FIG. 2B shows upon focusing on a close object (β=−1/30).

In respective graphs, FNO denotes an f-number, A denotes a half angle of view, NA denotes a numerical aperture, H0 denotes an object height (unit: mm). Moreover, d denotes an aberration curve at d-line (wavelength λ=587.6 nm), g denotes an aberration curve at g-line (wavelength λ=435.6 nm), and an aberration curve without mentioning denotes various aberrations with respect to d-line. In graphs showing astigmatism, a solid line indicates a sagittal image plane, and a broken line indicates a meridional image plane. In graphs showing coma, in each half angle of view or each object height, solid lines denote meridional coma at d-line and g-line, a broken line shown in the left side of the origin shows sagittal coma generated in meridional direction at d-line, and a broken line shown in right side of the origin shows sagittal coma generated in sagittal direction at d-line.

Incidentally, the same notation is used in the following Examples, so that duplicated explanations are omitted.

As is apparent from the respective graphs, the lens system according to Example 1 shows superb optical performance as a result of good corrections to various aberrations.

EXAMPLE 2

FIG. 3 is a sectional view showing a lens configuration of a lens system according to Example 2.

The lens system according to Example 2 is composed of, in order from an object side along an optical axis, a first lens group G1 having positive refractive power, and a second lens group G2 having positive refractive power. An aperture stop S is disposed between the first lens group G1 and the second lens group G2.

The first lens group G1 is composed of, in order from the object side along the optical axis, a sub-lens group GS11 having positive refractive power, and a sub-lens group GS12 having negative refractive power. The sub-lens group GS11 is constructed by a positive meniscus lens L111 having a convex surface facing the object side with stronger refractive power than an image side surface. The sub-lens group GS12 having negative refractive power is constructed by, in order from the object side along the optical axis, a positive meniscus lens L121 having a convex surface facing the object side with stronger refractive power than the image side surface and a negative meniscus lens L12R having a concave surface facing the image side.

The second lens group G2 is composed of, in order from the object side along the optical axis, a cemented lens constructed by a negative meniscus lens L21 having a concave surface facing the object side cemented with a positive meniscus lens L22 having a concave surface facing the object side with weaker refractive power than the image side surface, a positive meniscus lens L23 having a convex surface facing the image side, and a double convex positive lens L24 disposed to the most image side with stronger refractive power on the object side surface with respect to the image side surface. Light ray come out from the lens L24 forms an image on the image plane I.

Focusing on a close object is carried out by moving the first lens group G1 and the second lens group G2 toward the object side in a body.

Various values associated with the lens system according to Example 2 are listed in Table 2.

TABLE 2

[Specifications]

f = 51.61
FNO = 1.45
ω = 23.07
Y = 21.60
TL = 86.39

[Lens Data]

| i | r | d | nd | vd |
|---|---|---|---|---|
| 1 | 52.2387 | 6.0000 | 1.834807 | 42.71 |
| 2 | 565.2751 | 0.1000 | | |
| 3 | 28.1185 | 4.4000 | 2.000690 | 25.46 |
| 4 | 45.6886 | 1.5000 | | |
| 5 | 78.8809 | 2.0000 | 1.860740 | 23.06 |
| 6 | 19.8082 | 9.3000 | | |
| 7 | ∞ | 7.7000 | Aperture Stop S | |
| 8 | −19.2024 | 1.8000 | 1.805181 | 25.42 |
| 9 | −125.5269 | 6.0000 | 1.788001 | 47.37 |
| 10 | −29.9331 | 0.2000 | | |
| 11 | −92.9638 | 5.5000 | 1.834807 | 42.71 |
| 12 | −33.8967 | 0.1000 | | |
| 13 | 112.4183 | 3.3000 | 1.772499 | 49.60 |
| 14 | −161.9377 | (Bf) | | |

[Variable Distances]

| | INF | CLD |
|---|---|---|
| R = | ∞ | 1.64 |
| β = | 0.0 | −1/30 |
| Bf = | 38.4874 | 40.2076 |

[Values for Conditional Expressions]

(1) ndh = 2.000690
(2) f/f1 = 0.29794
(3) vdh = 25.46
(4) nNh = 1.860740
(5) |r2Na|/f = 0.37209
(6) |r2a|/r1b = 0.96941
(7) Bf/f = 0.74579
(8) vdN = 23.06

In the lens system according to Example 2, the lens having highest refractive power at d-line is the lens L121. The lens L12R is the negative lens LN satisfying conditional expression (4), and the lens L21 is the negative lens L2N having a concave surface facing the object side. Here, the radius of curvature of the object side surface of the lens L21 is r2Na and r2a, and the radius of curvature of the image side surface of the lens L12R is r1b.

Figure 4A:
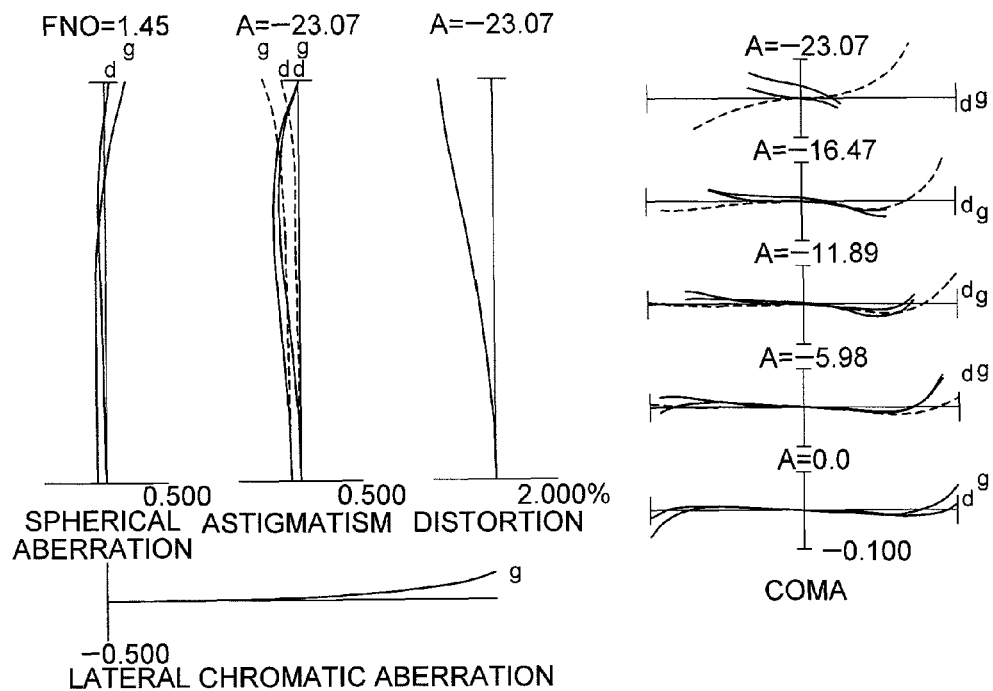
Figure 4B:
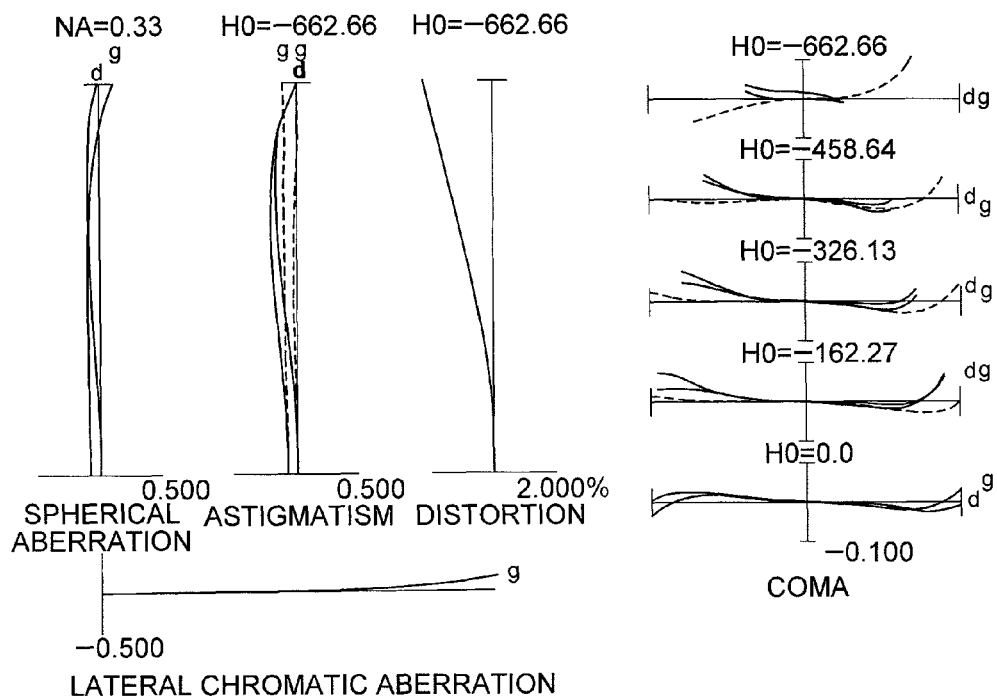

FIGS. 4A and 4B are graphs showing various aberrations of the lens system according to Example 2, in which FIG. 4A shows upon focusing on infinity (β=0.0), and FIG. 4B shows upon focusing on a close object (β=−1/30).

As is apparent from the respective graphs, the lens system according to Example 2 shows superb optical performance as a result of good corrections to various aberrations.

EXAMPLE 3

Figure 5:
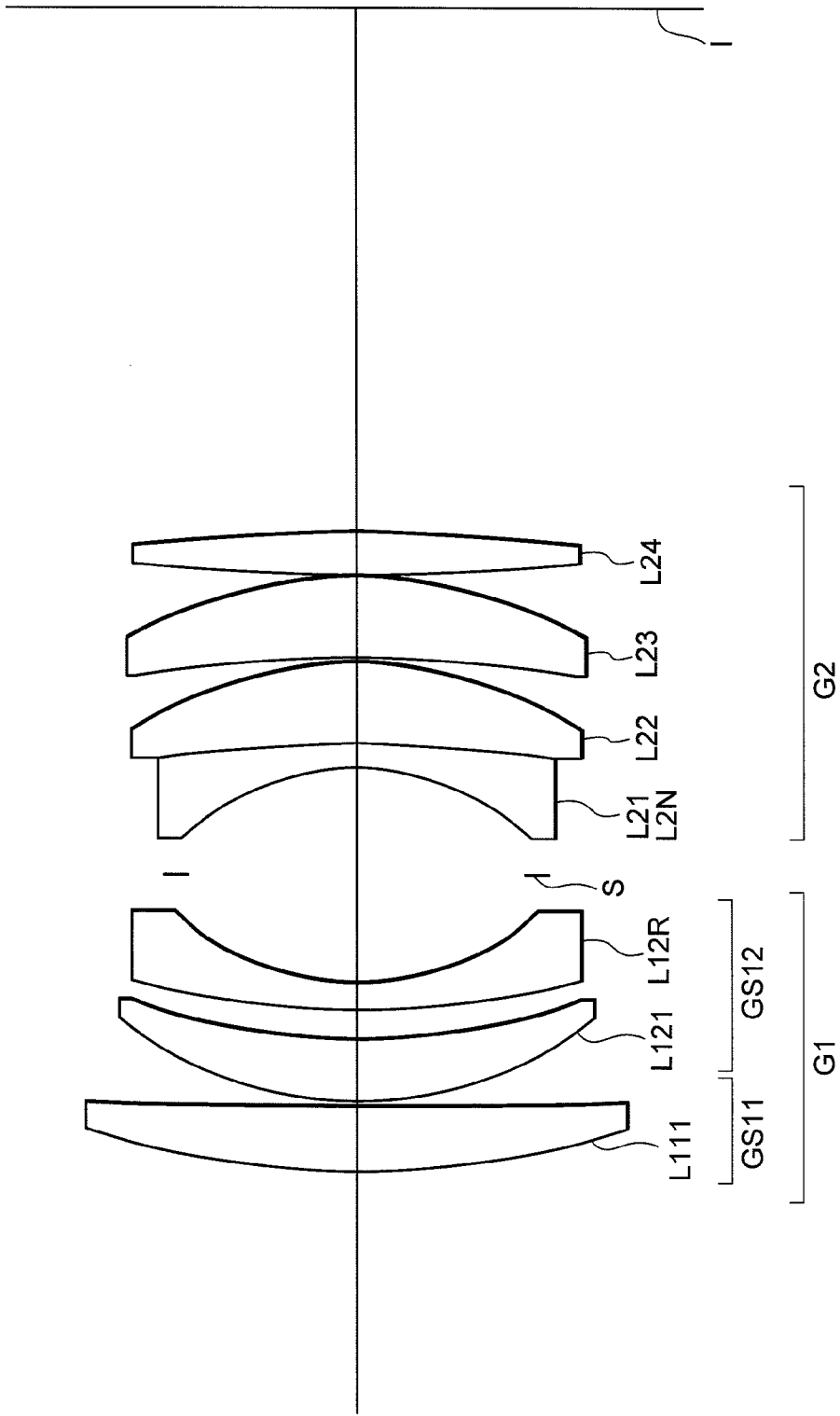
FIG. 5 is a sectional view showing a lens configuration of a lens system according to Example 3.

FIG. 5 is a sectional view showing a lens configuration of a lens system according to Example 3.

The lens system according to Example 3 is composed of, in order from an object side along an optical axis, a first lens group G1 having positive refractive power, and a second lens group G2 having positive refractive power. An aperture stop S is disposed between the first lens group G1 and the second lens group G2.

The first lens group G1 is composed of, in order from the object side along the optical axis, a sub-lens group GS11 having positive refractive power and a sub-lens group GS12 having negative refractive power. The sub-lens group GS11 is constructed by a positive meniscus lens L111 having a convex surface facing the object side with stronger refractive power than an image side surface. The sub-lens group GS12 is constructed by, in order from the object side along the optical axis, a positive meniscus lens L121 having a convex surface facing the object side with stronger refractive power than the image side surface and a negative meniscus lens L12R having a concave surface facing the image side.

The second lens group G2 is composed of, in order from the object side along the optical axis, a cemented lens constructed by a negative meniscus lens L21 having a concave surface facing the object side cemented with a positive meniscus lens L22 having a concave surface facing the object side with weaker refractive power than the image side surface, a positive meniscus lens L23 having a convex surface facing the image side, and a double convex positive lens L24 disposed to the most image side with stronger refractive power on the object side surface with respect to the image side surface. Light ray come out from the lens L24 forms an image on the image plane I.

Focusing on a close object is carried out by moving the first lens group G1 and the second lens group G2 toward the object side in a body.

Various values associated with the lens system according to Example 3 are listed in Table 3.

TABLE 3

[Specifications]

f = 51.61
FNO = 1.45
ω = 23.14
Y = 21.60
TL = 85.48

[Lens Data]

| i | r | d | nd | vd |
|---|---|---|---|---|
| 1 | 61.1431 | 4.8000 | 1.882997 | 40.76 |
| 2 | 389.5756 | 0.3000 | | |
| 3 | 26.8932 | 4.5000 | 2.000690 | 25.46 |
| 4 | 44.9000 | 2.2000 | | |
| 5 | 57.4287 | 2.0000 | 1.922860 | 20.50 |
| 6 | 19.2263 | 8.0000 | | |
| 7 | ∞ | 7.8000 | Aperture Stop S | |
| 8 | −18.6558 | 1.8000 | 1.805181 | 25.42 |
| 9 | −114.6796 | 6.0000 | 1.788001 | 47.37 |
| 10 | −30.1134 | 0.3000 | | |
| 11 | −114.9741 | 6.0000 | 1.834807 | 42.71 |
| 12 | −34.5098 | 0.1000 | | |
| 13 | 126.4714 | 3.2000 | 1.804000 | 46.57 |
| 14 | −161.9377 | (Bf) | | |

[Variable Distances]

| | INF | CLD |
|---|---|---|
| R = | ∞ | 1.64 |
| β = | 0.0 | −1/30 |
| Bf = | 38.4783 | 40.1986 |

[Values for Conditional Expressions]

(1) ndh = 2.000690
(2) f/f1 = 0.30465
(3) vdh = 25.46
(4) nNh = 1.922860
(5) |r2Na|/f = 0.36149
(6) |r2a|/r1b = 0.97033

TABLE 3-continued (7) Bf/f = 0.74558
(8) vdN = 20.50

In the lens system according to Example 3, the lens having highest refractive power at d-line is the lens L121. The lens L12R is the negative lens LN satisfying conditional expression (4), and the lens L21 is the negative lens L2N having a concave surface facing the object side. Here, the radius of curvature of the object side surface of the lens L21 is r2Na and r2a, and the radius of curvature of the image side surface of the lens L12R is r1b.

Figure 6A:
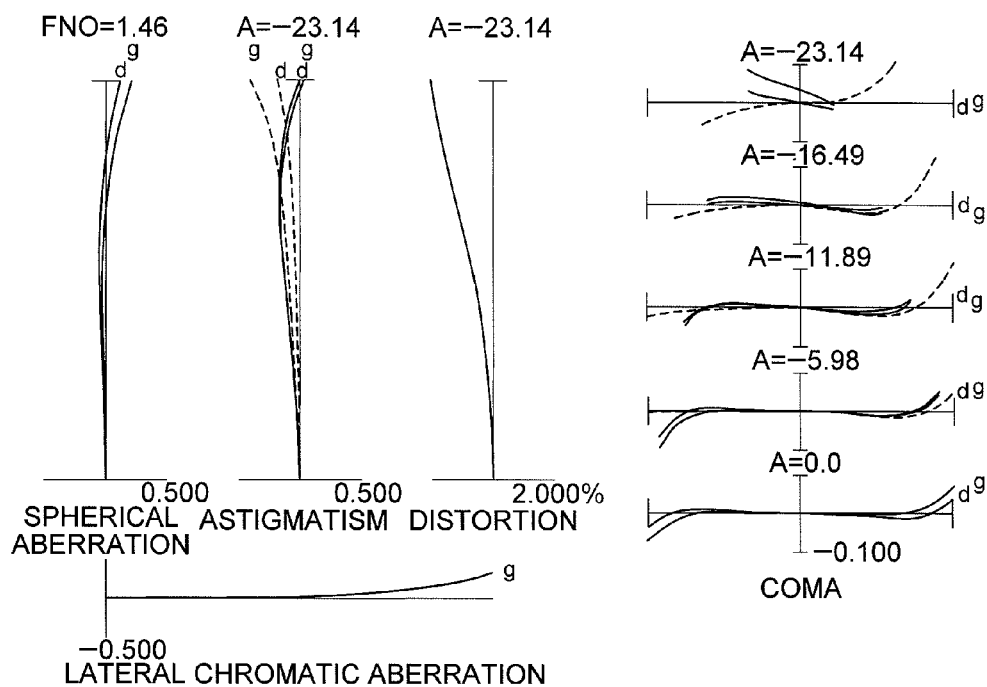
Figure 6B:
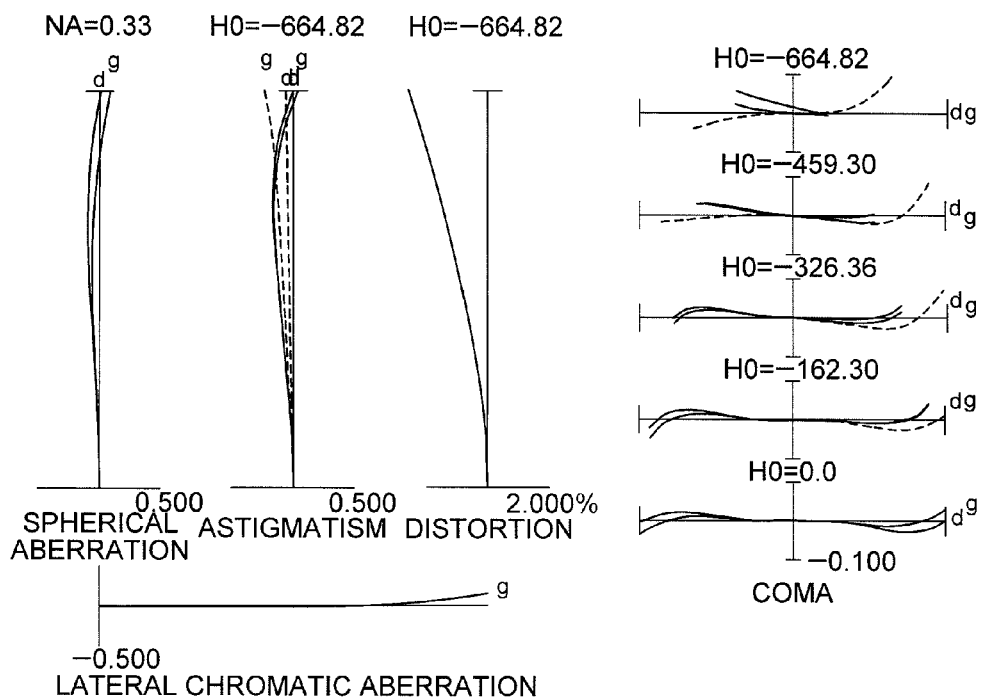

FIGS. 6A and 6B are graphs showing various aberrations of the lens system according to Example 3, in which FIG. 6A shows upon focusing on infinity (β=0.0), and FIG. 6B shows upon focusing on a close object (β=−1/30).

As is apparent from the respective graphs, the lens system according to Example 3 shows superb optical performance as a result of good corrections to various aberrations.

EXAMPLE 4

Figure 7:
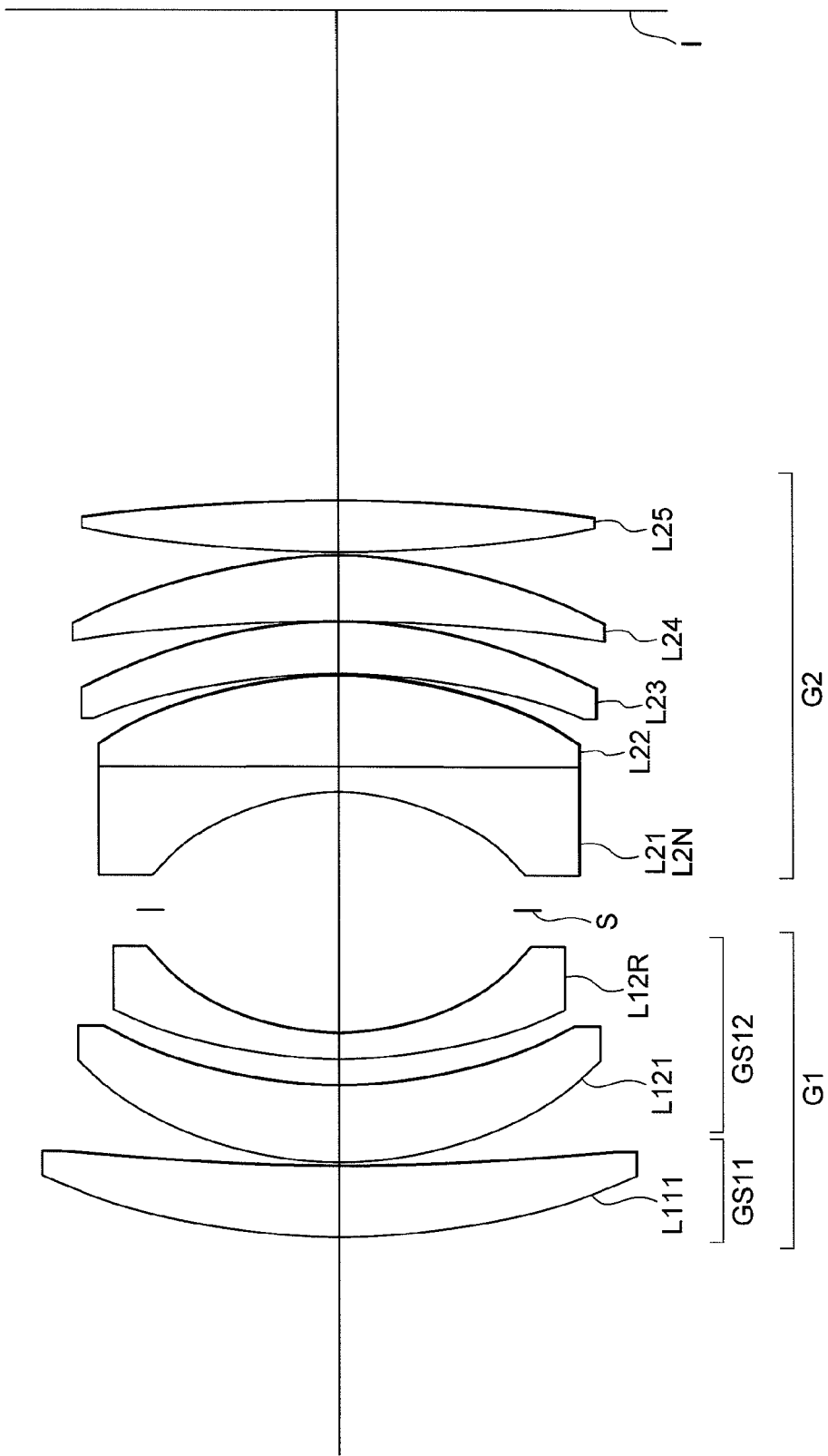
FIG. 7 is a sectional view showing a lens configuration of a lens system according to Example 4.

FIG. 7 is a sectional view showing a lens configuration of a lens system according to Example 4.

The lens system according to Example 4 is composed of, in order from an object side along an optical axis, a first lens group G1 having positive refractive power, and a second lens group G2 having positive refractive power. An aperture stop S is disposed between the first lens group G1 and the second lens group G2.

The first lens group G1 is composed of, in order from the object side along the optical axis, a sub-lens group GS11 having positive refractive power, and a sub-lens group GS12 having negative refractive power. The sub-lens group GS11 is constructed by a positive meniscus lens L111 having a convex surface facing the object side with stronger refractive power than an image side surface. The sub-lens group GS12 is constructed by, in order from the object side along the optical axis, a positive meniscus lens L121 having a convex surface facing the object side with stronger refractive power than the image side surface and a negative meniscus lens L12R having a concave surface facing the image side.

The second lens group G2 is composed of, in order from the object side along the optical axis, a cemented lens constructed by a double concave negative lens L21 having stronger refractive power on the object side surface than on the image side surface cemented with a double convex positive lens L22 having weaker refractive power on the object side surface than on the image side surface, a positive meniscus lens L23 having a convex surface facing the image side, a positive meniscus lens L24 having a convex surface facing the image side, and a double convex positive lens L25 disposed to the most image side with stronger refractive power on the object side surface with respect to the image side surface. Light ray come out from the lens L25 forms an image on the image plane I.

Focusing on a close object is carried out by moving the first lens group G1 and the second lens group G2 toward the object side in a body.

Various values associated with the lens system according to Example 4 are listed in Table 4.

TABLE 4

[Specifications]

f = 51.63
FNO = 1.25
ω = 23.33
Y = 21.60
TL = 94.94

[Lens Data]

| i | r | d | nd | vd |
|---|---|---|---|---|
| 1 | 57.5740 | 5.5000 | 1.903660 | 31.31 |
| 2 | 206.0906 | 0.2000 | | |
| 3 | 29.5832 | 6.0000 | 2.003300 | 28.27 |
| 4 | 38.8499 | 2.0000 | | |
| 5 | 41.1771 | 2.0000 | 1.922860 | 18.90 |
| 6 | 19.7787 | 9.5000 | | |
| 7 | ∞ | 9.2000 | Aperture Stop S | |
| 8 | −19.4166 | 2.0000 | 1.805181 | 25.42 |
| 9 | 3374.4434 | 7.0000 | 1.804000 | 46.57 |
| 10 | −36.6779 | 0.2000 | | |
| 11 | −56.5118 | 4.0000 | 1.882997 | 40.76 |
| 12 | −42.4595 | 0.1000 | | |
| 13 | −143.9382 | 5.0000 | 1.834807 | 42.71 |
| 14 | −44.3487 | 0.3000 | | |
| 15 | 103.1998 | 4.0000 | 1.754999 | 52.32 |
| 16 | −161.9377 | (Bf) | | |

[Variable Distances]

| | INF | CLD |
|---|---|---|
| R = | ∞ | 1.64 |
| β = | 0.0 | −1/30 |
| Bf = | 37.9374 | 39.6583 |

[Values for Conditional Expressions]

(1) ndh = 2.003300
(2) f/f1 = 0.29576
(3) vdh = 28.27
(4) nNh = 1.922860
(5) |r2Na|/f = 0.37608
(6) |r2a|/r1b = 0.98169
(7) Bf/f = 0.73481
(8) vdN = 18.90

In the lens system according to Example 4, the lens having highest refractive power at d-line is the lens L121. The lens L12R is the negative lens LN satisfying conditional expression (4), and the lens L21 is the negative lens L2N having a concave surface facing the object side. Here, the radius of curvature of the object side surface of the lens L21 is r2Na and r2a, and the radius of curvature of the image side surface of the lens L12R is r1b.

Figure 8A:
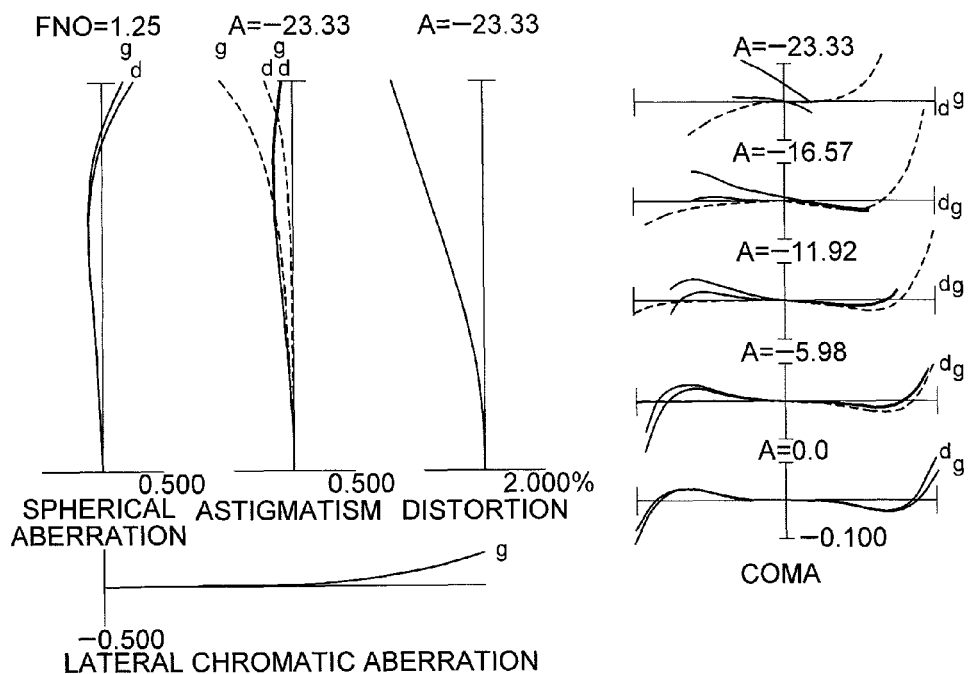
Figure 8B:
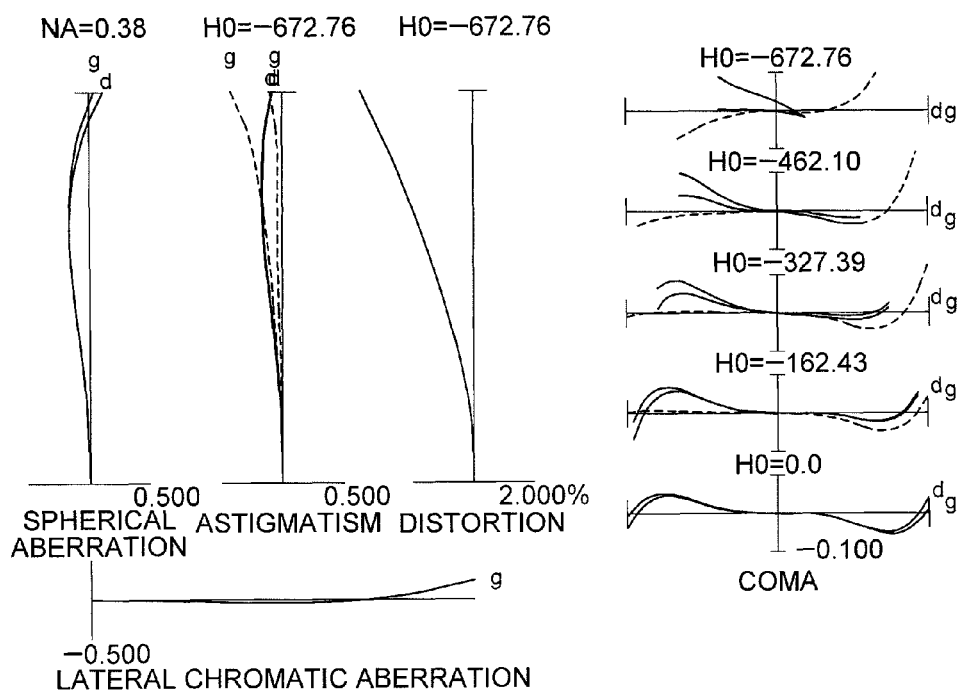

FIGS. 8A and 8B are graphs showing various aberrations of the lens system according to Example 4, in which FIG. 8A shows upon focusing on infinity (β=0.0), and FIG. 8B shows upon focusing on a close object (β=−1/30).

As is apparent from the respective graphs, the lens system according to Example 4 shows superb optical performance as a result of good corrections to various aberrations.

EXAMPLE 5

FIG. 9 is a sectional view showing a lens configuration of a lens system according to Example 5.

The lens system according to Example 5 is composed of, in order from an object side along an optical axis, a first lens group G1 having positive refractive power, and a second lens group G2 having positive refractive power. An aperture stop S is disposed between the first lens group G1 and the second lens group G2.

The first lens group G1 is composed of, in order from the object side along the optical axis, a sub-lens group GS11 having positive refractive power, and a sub-lens group GS12 having negative refractive power. The sub-lens group GS11 is constructed by a positive meniscus lens L111 having a convex surface facing the object side with stronger refractive power than an image side surface. The sub-lens group GS12 is constructed by, in order from the object side along the optical axis, a positive meniscus lens L121 having a convex surface facing the object side with stronger refractive power than the image side surface and a negative meniscus lens L12R having a concave surface facing the image side.

The second lens group G2 is composed of, in order from the object side along the optical axis, a cemented lens constructed by a negative meniscus lens L21 having a concave surface facing the object side cemented with a positive meniscus lens L22 having a concave surface facing the object side with weaker refractive power than the image side surface, a positive meniscus lens L23 having a convex surface facing the image side, and a cemented lens constructed by a positive lens L24 having a convex surface facing the image side whose radius of curvature is smaller than that of the object side surface cemented with a negative meniscus lens L25 having a concave surface facing the object side. Light ray come out from the lens L25 forms an image on the image plane I.

Focusing on a close object is carried out by moving the first lens group G1 and the second lens group G2 toward the object side in a body.

Various values associated with the lens system according to Example 5 are listed in Table 5.

TABLE 5

[Specifications]

f = 51.61
FNO = 1.45
ω = 23.13
Y = 21.60
TL = 87.36

[Lens Data]

| i | r | d | nd | vd |
|---|---|---|---|---|
| 1 | 62.5707 | 4.6000 | 1.834807 | 42.71 |
| 2 | 1079.5273 | 0.1000 | | |
| 3 | 27.8402 | 4.5000 | 1.903660 | 31.31 |
| 4 | 48.9187 | 2.0000 | | |
| 5 | 83.6288 | 1.6000 | 1.805181 | 25.42 |
| 6 | 20.6020 | 9.5000 | | |
| 7 | ∞ | 7.7000 | Aperture Stop S | |
| 8 | −19.6349 | 1.8000 | 1.846660 | 23.78 |
| 9 | −36.0084 | 6.0000 | 1.754999 | 52.32 |
| 10 | −28.9194 | 0.2000 | | |
| 11 | −100.0147 | 4.5000 | 1.834807 | 42.71 |
| 12 | −35.2169 | 0.1000 | | |
| 13 | 140.8843 | 5.0000 | 2.003300 | 28.27 |
| 14 | −49.8565 | 1.5000 | 1.922860 | 18.90 |
| 15 | −391.9566 | (Bf) | | |

[Variable Distances]

| | INF | CLD |
|---|---|---|
| R = | ∞ | 1.65 |
| β = | 0.0 | −1/30 |
| Bf = | 38.2645 | 39.9850 |

[Values for Conditional Expressions]

(1) ndh = 2.003300
(2) f/f1 = 0.28536
(3) vdh = 28.27

TABLE 5-continued (4) nNh = 1.846660 (L21)
(4) nNh = 1.922860 (L25)
(5) |r2Na|/f = 0.38041 (L21)
(6), (6A) |r2a|/r1b = 0.95306
(7) Bf/f = 0.74135
(8) vdN = 23.78 (L21)
(8) vdN = 18.90 (L25)
(9) n2dh = 2.003300

In the lens system according to Example 5, the lens having highest refractive power at d-line is the lens L24. The lenses L21 and L25 are the negative lens LN satisfying conditional expression (4), and the negative lens L2N having a concave surface facing the object side. Here, the radius of curvature of the object side surface of the lens L21 is r2Na and r2a, and the radius of curvature of the image side surface of the lens L12R is r1b.

Figure 10A:
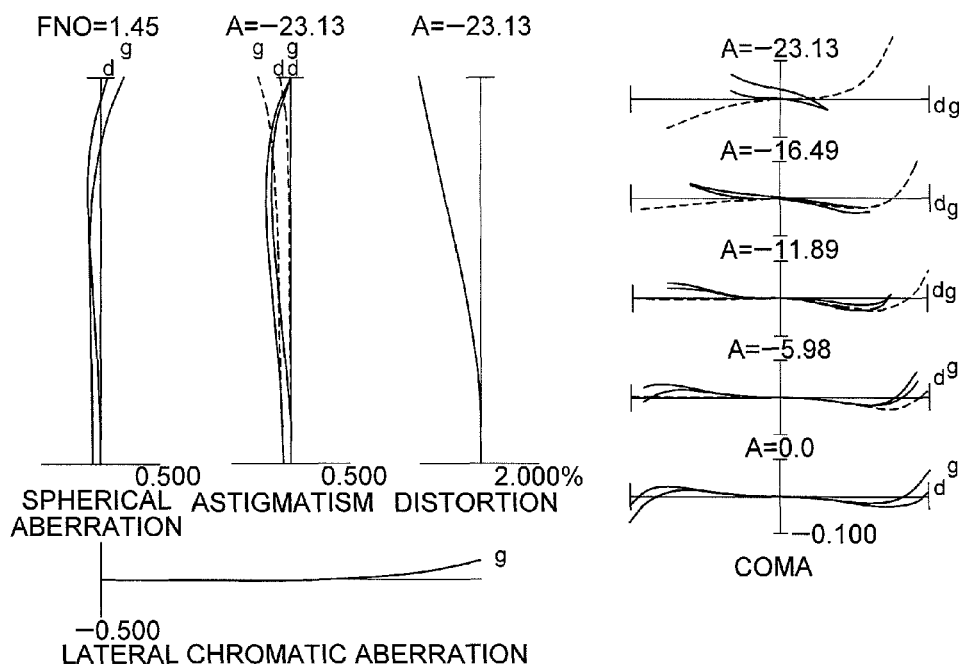
Figure 10B:
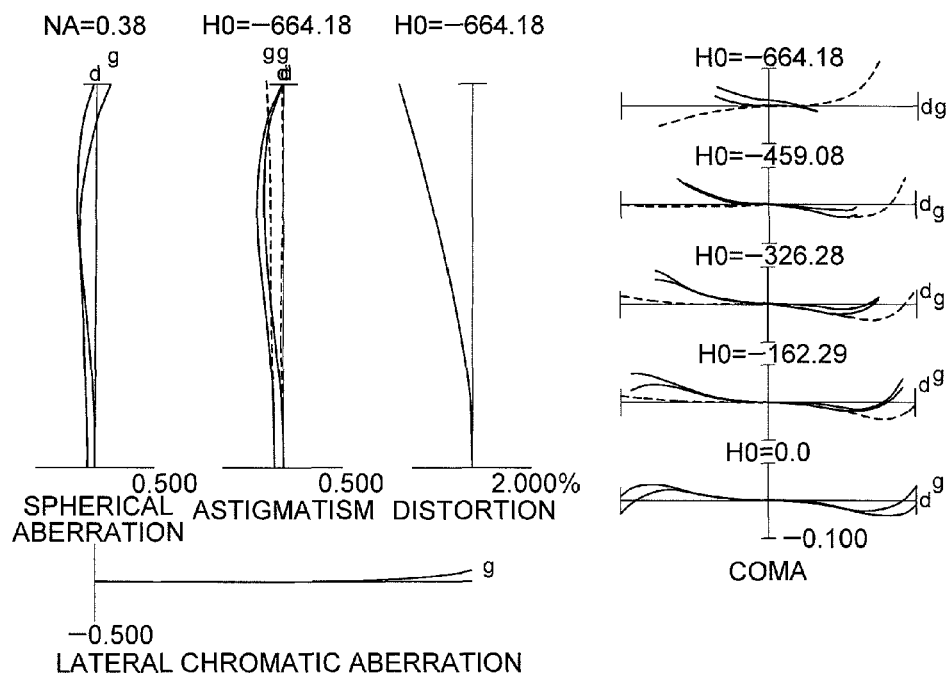

FIGS. 10A and 10B are graphs showing various aberrations of the lens system according to Example 5, in which FIG. 10A shows upon focusing on infinity ($\beta$=0.0), and FIG. 10B shows upon focusing on a close object ($\beta$=−1/30).

As is apparent from the respective graphs, the lens system according to Example 5 shows superb optical performance as a result of good corrections to various aberrations.

EXAMPLE 6

FIG. 11 is a sectional view showing a lens configuration of a lens system according to Example 6.

The lens system according to Example 6 is composed of, in order from an object side along an optical axis, a first lens group G1 having negative refractive power, and a second lens group G2 having positive refractive power. An aperture stop S is disposed between the first lens group G1 and the second lens group G2.

The first lens group G1 is composed of, in order from the object side along the optical axis, a sub-lens group GS11 having positive refractive power, and a sub-lens group GS12 having negative refractive power. The sub-lens group GS11 is constructed by a positive meniscus lens L111 having a convex surface facing the object side with stronger refractive power than an image side surface. The sub-lens group GS12 is constructed by, in order from the object side along the optical axis, a negative meniscus lens L121 having a convex surface facing the object side and a positive meniscus lens L12R having a concave surface facing the image side.

The second lens group G2 is composed of, in order from the object side along the optical axis, a cemented lens constructed by a negative meniscus lens L21 having a concave surface facing the object side cemented with a positive meniscus lens L22 having a concave surface facing the object side with weaker refractive power than the image side surface, a positive meniscus lens L23 having a convex surface facing the image side, and a double convex positive lens L24 disposed to the most image side with stronger refractive power on the image side surface with respect to the object side surface. Light ray come out from the lens L24 forms an image on the image plane I.

Focusing on a close object is carried out by moving the first lens group G1 and the second lens group G2 toward the object side in a body.

In the lens system according to Example 6, although the lens L111 is constructed by a single lens, the lens may be constructed by a cemented lens. In this case, spherical aberration and longitudinal chromatic aberration can be excellently corrected, so that it is desirable.

Various values associated with the lens system according to Example 6 are listed in Table 6.

TABLE 6

[Specifications]

f = 51.60
FNO = 2.10
$\omega$ = 25.28
Y = 24.00
TL = 108.47

[Lens Data]

| i | r | d | nd | vd |
|---|---|---|---|---|
| 1 | 51.0799 | 4.0000 | 1.799516 | 42.22 |
| 2 | 153.5021 | 1.0000 | | |
| 3 | 25.0934 | 2.0000 | 1.834807 | 42.71 |
| 4 | 16.6855 | 7.0000 | | |
| 5 | 17.7942 | 2.5000 | 2.019600 | 21.45 |
| 6 | 17.4360 | 8.0000 | | |
| 7 | ∞ | 9.0000 | Aperture Stop S | |
| 8 | −20.1623 | 1.5000 | 1.860740 | 23.06 |
| 9 | −141.0470 | 8.0000 | 1.754999 | 52.32 |
| 10 | −24.1458 | 1.0000 | | |
| 11 | −82.3047 | 4.5000 | 1.834807 | 42.71 |
| 12 | −39.2143 | 0.5000 | | |
| 13 | 187.0181 | 3.5000 | 1.804000 | 46.57 |
| 14 | −161.9377 | (Bf) | | |

[Variable Distances]

| | INF | CLD |
|---|---|---|
| R = | ∞ | 1.66 |
| $\beta$ = | 0.0 | −1/30 |
| Bf = | 55.9690 | 57.6889 |

[Values for Conditional Expressions]

(1) ndh = 2.019600
(2) f/f1 = −0.02715
(4) nNh = 1.834807 (L121)
(4) nNh = 1.860740 (L21)
(5) |r2Na|/f = 0.39073
(6) |r2a|/r1b = 1.15636
(8) vdN = 23.06 (L21)

In the lens system according to Example 6, the lens having highest refractive power at d-line is the lens L12R. The lenses L121 and L21 are the negative lens LN satisfying conditional expression (4), and the lens L21 is also the negative lens L2N having a concave surface facing the object side. Here, the radius of curvature of the object side surface of the lens L21 is r2Na and r2a, and the radius of curvature of the image side surface of the lens L12R is r1b.

Figure 12A:
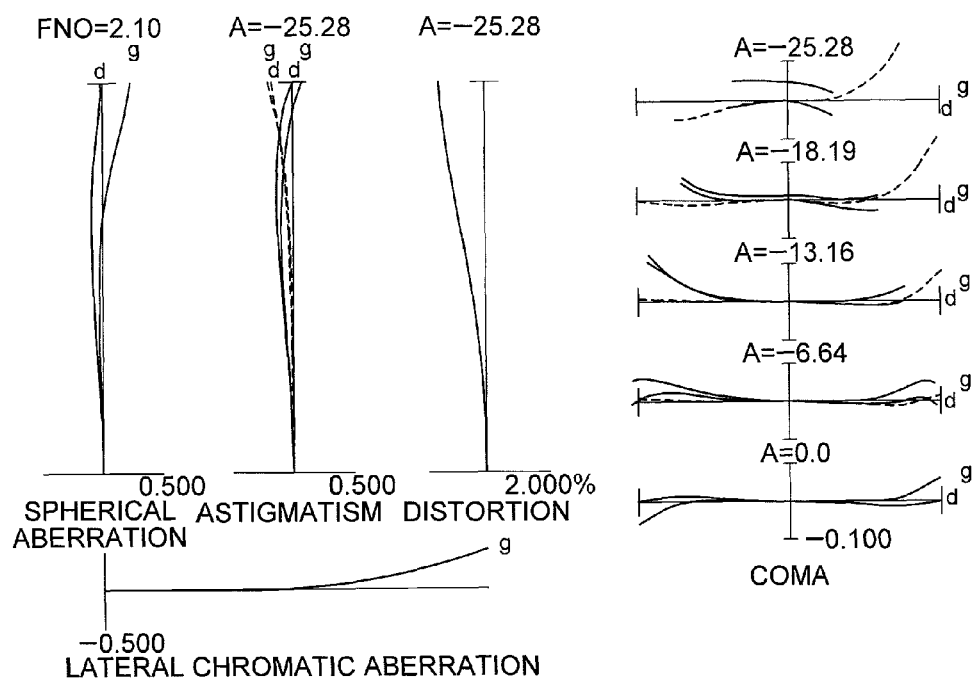
Figure 12B:
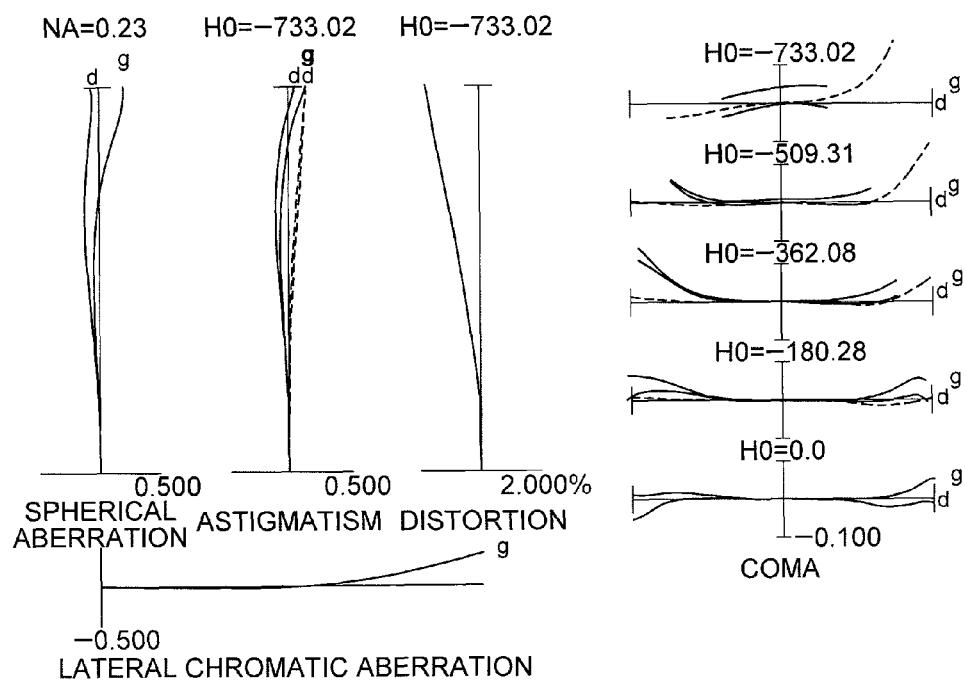

FIGS. 12A and 12B are graphs showing various aberrations of the lens system according to Example 6, in which FIG. 12A shows upon focusing on infinity ($\beta$=0.0), and FIG. 12B shows upon focusing on a close object ($\beta$=−1/30).

As is apparent from the respective graphs, the lens system according to Example 6 shows superb optical performance as a result of good corrections to various aberrations.

EXAMPLE 7

Figure 13:
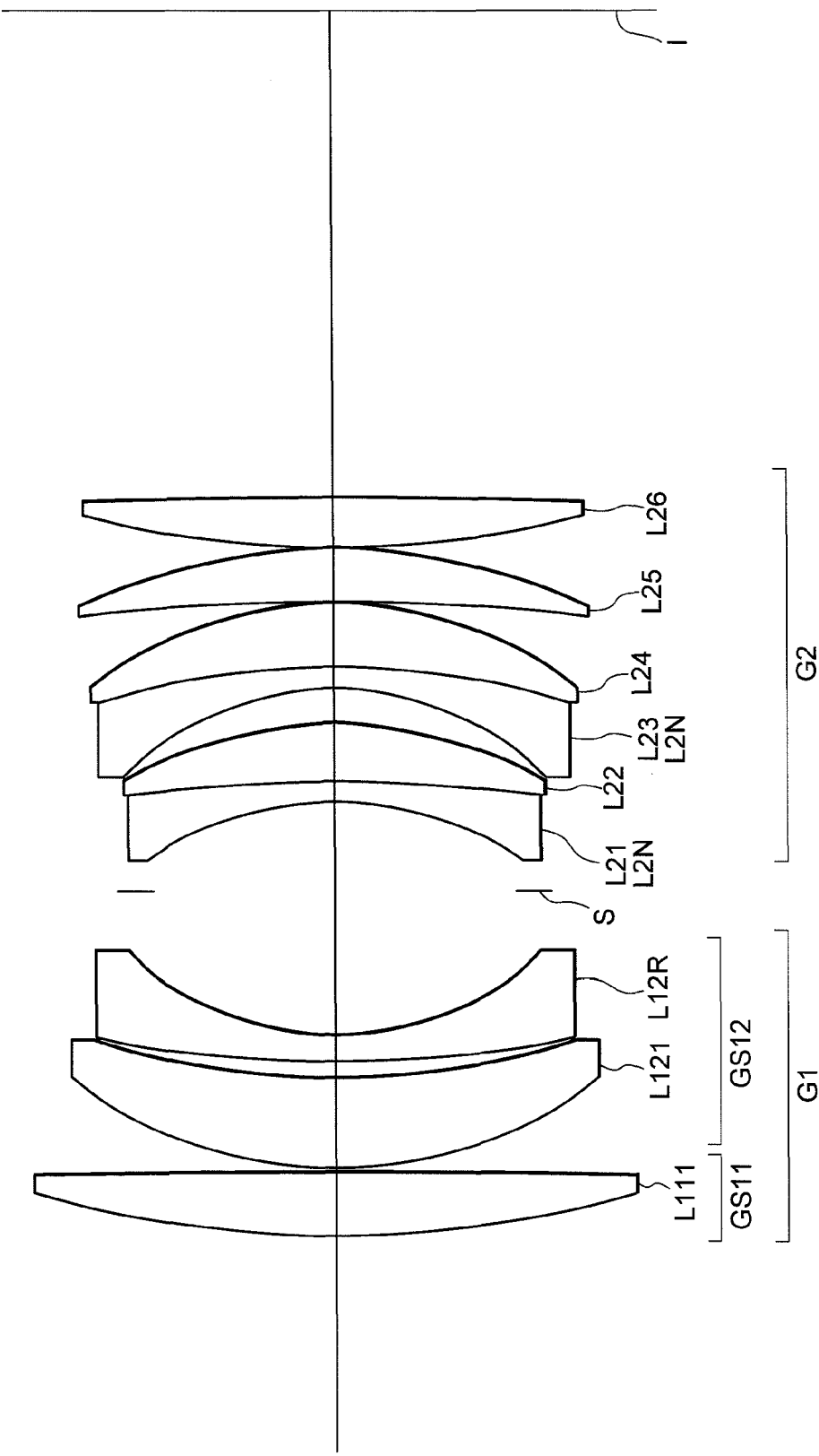
FIG. 13 is a sectional view showing a lens configuration of a lens system according to Example 7.

FIG. 13 is a sectional view showing a lens configuration of a lens system according to Example 7.

The lens system according to Example 7 is composed of, in order from an object side along an optical axis, a first lens group G1 having positive refractive power, and a second lens group G2 having positive refractive power. An aperture stop S is disposed between the first lens group G1 and the second lens group G2.

The first lens group G1 is composed of, in order from the object side along the optical axis, a sub-lens group GS11 having positive refractive power and a sub-lens group GS12 having negative refractive power. The sub-lens group GS11 is constructed by a positive meniscus lens L111 having a convex surface facing the object side with stronger refractive power than an image side surface. The sub-lens group GS12 is constructed by, in order from the object side along the optical axis, a positive meniscus lens L121 having a convex surface facing the object side with stronger refractive power than the image side surface and a negative meniscus lens L12R having a concave surface facing the image side.

The second lens group G2 is composed of, in order from the object side along the optical axis, a cemented lens constructed by a negative meniscus lens L21 having a concave surface facing the object side cemented with a positive meniscus lens L22 having a concave surface facing the object side with weaker refractive power than the image side surface, a cemented lens constructed by a negative meniscus lens L23 having a concave surface facing the object side cemented with a positive meniscus lens L24 having a concave surface facing the object side with weaker refractive power than the image side surface, a positive meniscus lens L25 having a convex surface facing the image side, and a double convex positive lens L26 disposed to the most image side with stronger refractive power on the object side surface with respect to the image side surface. Light ray come out from the lens L26 forms an image on the image plane I.

Focusing on a close object is carried out by moving the first lens group G1 and the second lens group G2 toward the object side in a body.

Various values associated with the lens system according to Example 7 are listed in Table 7.

TABLE 7

[Specifications]

f = 51.60
FNO = 1.25
ω = 23.29
Y = 21.60
TL = 95.78

[Lens Data]

| i | r | d | nd | vd |
|---|---|---|---|---|
| 1 | 81.4768 | 5.0000 | 1.804000 | 46.57 |
| 2 | −2838.8241 | 0.3000 | | |
| 3 | 33.1597 | 7.0000 | 1.950300 | 29.42 |
| 4 | 60.4403 | 1.4000 | | |
| 5 | 95.3280 | 2.0000 | 1.761821 | 26.52 |
| 6 | 23.0471 | 11.3000 | | |
| 7 | ∞ | 7.0000 | Aperture Stop S | |
| 8 | −26.4313 | 1.6000 | 1.805181 | 25.42 |
| 9 | −125.7273 | 4.6000 | 1.804000 | 46.57 |
| 10 | −32.7268 | 2.7000 | | |
| 11 | −23.4449 | 1.7000 | 1.805181 | 25.42 |
| 12 | −64.8415 | 5.0000 | 1.882997 | 40.76 |
| 13 | −31.7094 | 0.1000 | | |
| 14 | −187.5490 | 4.2000 | 1.882997 | 40.76 |
| 15 | −47.3960 | 0.1000 | | |
| 16 | 79.1117 | 3.8000 | 1.804000 | 46.57 |
| 17 | −1019.1299 | (Bf) | | |

TABLE 7-continued

[Variable Distances]

| | INF | CLD |
|---|---|---|
| R = | ∞ | 1.64 |
| β = | 0.0 | −1/30 |
| Bf = | 37.9796 | 39.6996 |

[Values for Conditional Expressions]

(1) ndh = 1.950300
(2) f/f1 = 0.30850
(3) vdh = 29.42
(5) |r2Na|/f = 0.51223 (L21)
(5) |r2Na|/f = 0.45435 (L23)
(6) |r2a|/r1b = 1.14684
(7) Bf/f = 0.73603

In the lens system according to Example 7, the lens having highest refractive power at d-line is the lens L121. The lenses L21 and L23 are the negative lens L2N having a concave surface facing the object side. Here, the radius of curvature of the object side surface of the lens L21 is r2Na and r2a, and the radius of curvature of the image side surface of the lens L12R is r1b. The radius of curvature of the object side surface of the lens L23 is r2Na.

Figure 14A:
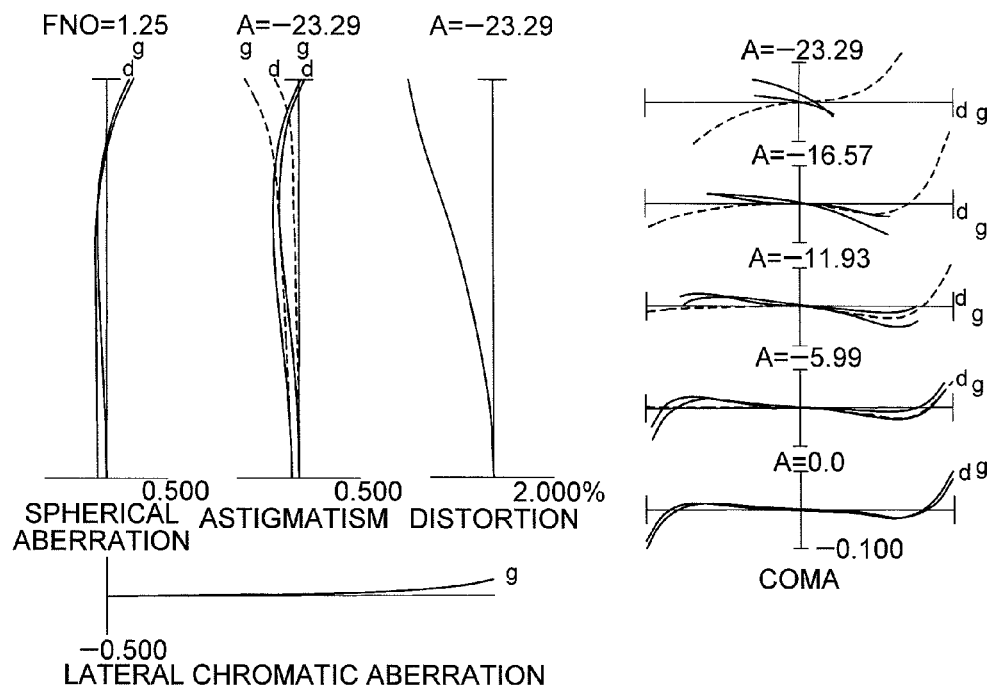
Figure 14B:
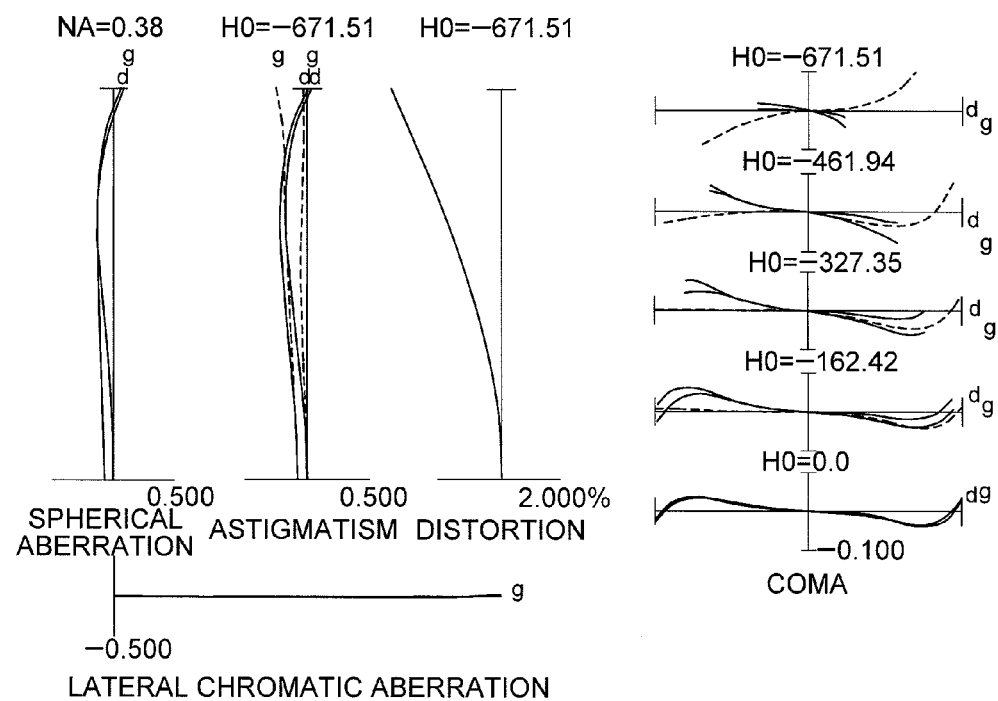

FIGS. 14A and 14B are graphs showing various aberrations of the lens system according to Example 7, in which FIG. 14A shows upon focusing on infinity (β=0.0), and FIG. 14B shows upon focusing on a close object (β=−1/30).

As is apparent from the respective graphs, the lens system according to Example 7 shows superb optical performance as a result of good corrections to various aberrations.

EXAMPLE 8

FIG. 15 is a sectional view showing a lens configuration of a lens system according to Example 8.

The lens system according to Example 8 is composed of, in order from an object side along an optical axis, a first lens group G1 having positive refractive power, and a second lens group G2 having positive refractive power. An aperture stop S is disposed between the first lens group G1 and the second lens group G2.

The first lens group G1 is composed of, in order from the object side along the optical axis, a sub-lens group GS11 having positive refractive power, and a sub-lens group GS12 having negative refractive power. The sub-lens group GS11 is constructed by a positive meniscus lens L111 having a convex surface facing the object side with stronger refractive power than an image side surface. The sub-lens group GS12 is constructed by, in order from the object side along the optical axis, a positive meniscus lens L121 having a convex surface facing the object side with stronger refractive power than the image side surface and a negative meniscus lens L12R having a concave surface facing the image side.

The second lens group G2 is composed of, in order from the object side along the optical axis, a cemented lens constructed by a negative meniscus lens L21 having a concave surface facing the object side cemented with a positive meniscus lens L22 having a concave surface facing the object side with weaker refractive power than the image side surface, a positive meniscus lens L23 having a convex surface facing the image side, and a double convex positive lens L24 disposed to the most image side with stronger refractive power on the object side surface with respect to the image side surface. Light ray come out from the lens L24 forms an image on the image plane I.

Focusing on a close object is carried out by moving the first lens group G1 and the second lens group G2 toward the object side in a body.

Various values associated with the lens system according to Example 8 are listed in Table 8.

TABLE 8

[Specifications]

f = 51.62
FNO = 1.44
ω = 23.19
Y = 21.60
TL = 86.13

[Lens Data]

| i | r | d | nd | νd |
|---|---|---|---|---|
| 1 | 61.9292 | 5.2000 | 1.834807 | 42.71 |
| 2 | 250.9282 | 0.1000 | | |
| 3 | 25.5456 | 4.5000 | 2.003300 | 28.27 |
| 4 | 37.7633 | 1.8000 | | |
| 5 | 40.4696 | 2.0000 | 1.808090 | 22.79 |
| 6 | 17.5981 | 9.3000 | | |
| 7 | ∞ | 7.7000 | Aperture Stop S | |
| 8 | −17.8081 | 1.8000 | 1.846660 | 23.78 |
| 9 | −205.7528 | 6.0000 | 1.788001 | 47.37 |
| 10 | −27.6209 | 0.2000 | | |
| 11 | −110.8983 | 5.5000 | 1.804000 | 46.57 |
| 12 | −31.7495 | 0.1000 | | |
| 13 | 136.7328 | 3.0000 | 2.003300 | 28.27 |
| 14 | −375.0666 | (Bf) | | |

[Variable Distances]

| | INF | CLD |
|---|---|---|
| R = | ∞ | 1.64 |
| β = | 0.0 | −1/30 |
| Bf = | 38.9302 | 40.6510 |

[Values for Conditional Expressions]

(2) f/f1 = 0.33611
(3) ν2dh = 28.27
(4) nNh = 1.846660
(5) |r2Na|/f = 0.34495
(6A) |r2a|/r1b = 1.01193
(7) Bf/f = 0.75410
(9) n2dh = 2.003300

In the lens system according to Example 8, the lens having highest refractive power at d-line (wavelength=587.6 nm) in the second lens group G2 is the lens L24. The lens L21 is the negative lens LN satisfying conditional expression (4), and the negative lens L2N having a concave surface facing the object side. Here, the radius of curvature of the object side surface of the lens L21 is r2Na and r2a, and the radius of curvature of the image side surface of the lens L12R is r1b.

Figure 16A:
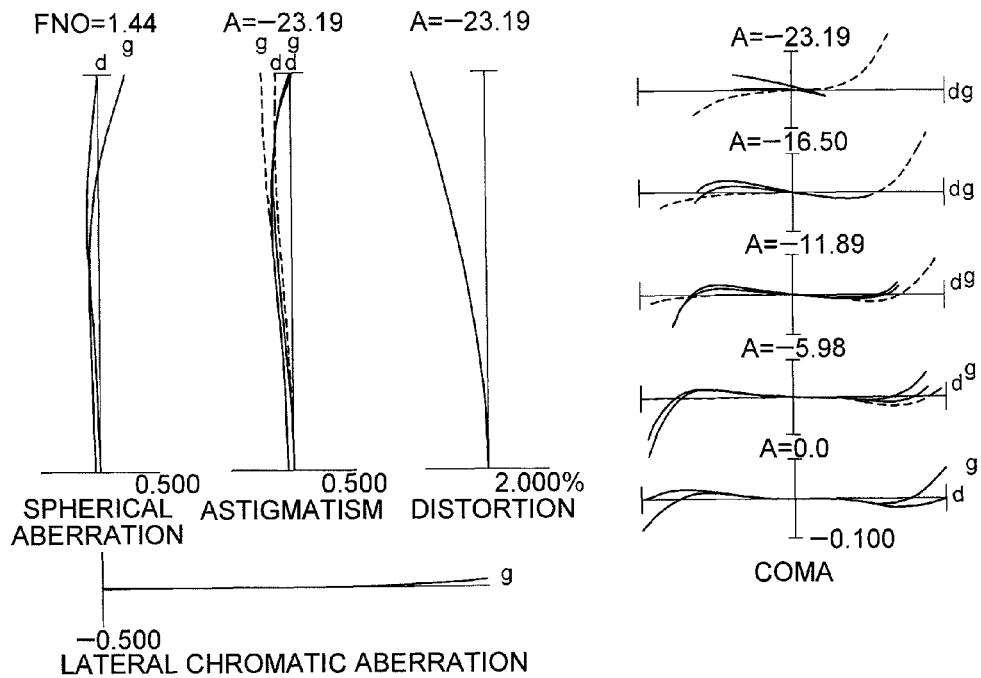
Figure 16B:
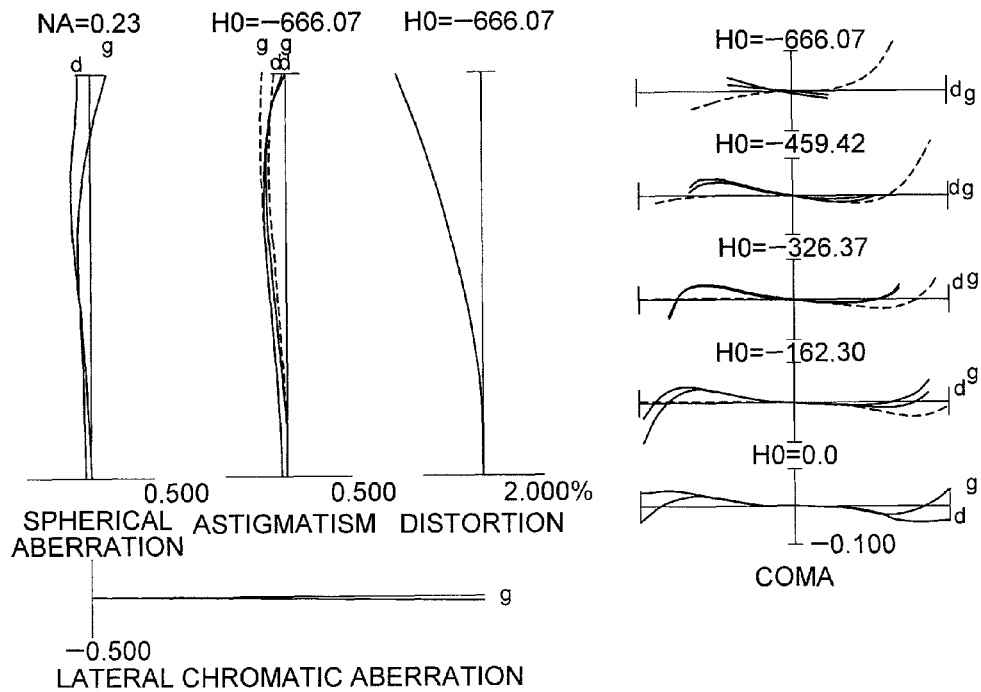

FIGS. 16A and 16B are graphs showing various aberrations of the lens system according to Example 8, in which FIG. 16A shows upon focusing on infinity (β=0.0), and FIG. 16B shows upon focusing on a close object (β=−1/30).

As is apparent from the respective graphs, the lens system according to Example 8 shows superb optical performance as a result of good corrections to various aberrations.

EXAMPLE 9

FIG. 17 is a sectional view showing a lens configuration of a lens system according to Example 9.

The lens system according to Example 9 is composed of, in order from an object side along an optical axis, a first lens group G1 having positive refractive power, and a second lens group G2 having positive refractive power. An aperture stop S is disposed between the first lens group G1 and the second lens group G2.

The first lens group G1 is composed of, in order from the object side along the optical axis, a sub-lens group GS11 having positive refractive power, and a sub-lens group GS12 having negative refractive power. The sub-lens group GS11 is constructed by a positive meniscus lens L111 having a convex surface facing the object side with stronger refractive power than an image side surface. The sub-lens group GS12 is constructed by, in order from the object side along the optical axis, a negative meniscus lens L121 having a convex surface facing the object side and a positive meniscus lens L12R having a concave surface facing the image side.

The second lens group G2 is composed of, in order from the object side along the optical axis, a cemented lens constructed by a double concave negative lens L21 whose radius of curvature of the object side surface is smaller than that of the image side surface cemented with a double convex positive lens L22 whose radius of curvature of the image side surface is smaller than that of the object side surface, a positive meniscus lens L23 having a convex surface facing the image side, and a double convex positive lens L24 disposed to the most image side with stronger refractive power on the image side surface with respect to the object side surface. Light ray come out from the lens L24 forms an image on the image plane I.

Focusing on a close object is carried out by moving the first lens group G1 and the second lens group G2 toward the object side in a body.

In Example 9, although the lens element L111 is composed of a single lens, the lens element L111 may be a cemented lens. In this case, spherical aberration and longitudinal chromatic aberration can be excellently corrected.

Various values associated with the lens system according to Example 9 are listed in Table 9.

TABLE 9

[Specifications]

f = 51.60
FNO = 2.06
ω = 25.23
Y = 24.00
TL = 107.25

[Lens Data]

| i | r | d | nd | νd |
|---|---|---|---|---|
| 1 | 50.5356 | 4.0000 | 1.799516 | 42.22 |
| 2 | 154.2377 | 1.0000 | | |
| 3 | 24.8887 | 2.0000 | 1.834807 | 42.71 |
| 4 | 16.7477 | 7.0000 | | |
| 5 | 17.2732 | 2.5000 | 2.019600 | 21.45 |
| 6 | 16.8254 | 8.0000 | | |
| 7 | ∞ | 9.0000 | Aperture Stop S | |
| 8 | −20.4694 | 1.5000 | 1.860740 | 23.06 |
| 9 | 547.0172 | 8.2000 | 1.754999 | 52.32 |
| 10 | −25.9174 | 1.0000 | | |
| 11 | −113.9151 | 4.3000 | 1.834807 | 42.71 |
| 12 | −37.7986 | 0.5000 | | |
| 13 | 391.9984 | 3.3000 | 1.903658 | 31.31 |
| 14 | −161.9377 | (Bf) | | |

TABLE 9-continued

[Variable Distances]

|  | INF | CLD |
|---|---|---|
| R = | ∞ | 1.66 |
| β = | 0.0 | −1/30 |
| Bf = | 54.9471 | 56.6672 |

[Values for Conditional Expressions]

(2) f/f1 = 0.00263
(3) ν2dh = 31.31
(4) nNh = 1.834807 (L121)
(4) nNh = 1.860740 (L21)
(5) |r2Na|/f = 0.39668
(6A) |r2a|/r1b = 1.21658
(7) Bf/f = 1.06482
(9) n2dh = 1.903658

In the lens system according to Example 9, the lens having highest refractive power at d-line (wavelength=587.6 nm) composing the second lens group G2 is the lens L24. The lenses L121 and L21 are the negative lens LN satisfying conditional expression (4), and the lens L21 is also the negative lens L2N having a concave surface facing the object side.

Here, the radius of curvature of the object side surface of the lens L21 is r2Na and r2a, and the radius of curvature of the image side surface of the lens L12R is r1b.

Figure 18A:
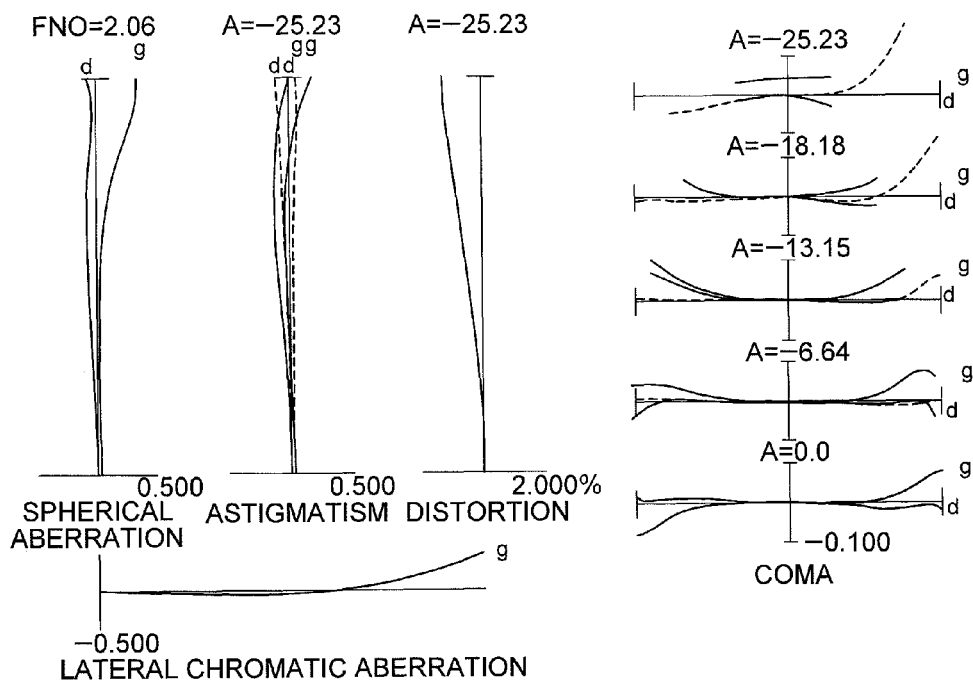
Figure 18B:
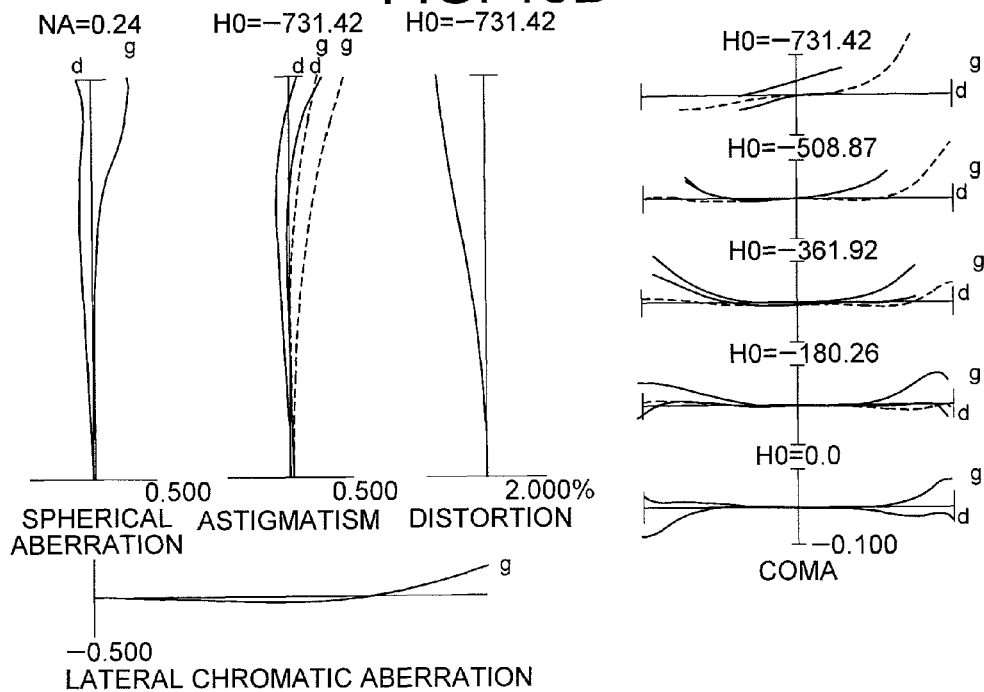

FIGS. 18A and 18B are graphs showing various aberrations of the lens system according to Example 9, in which FIG. 18A shows upon focusing on infinity (β=0.0), and FIG. 18B shows upon focusing on a close object (β=−1/30).

As is apparent from the respective graphs, the lens system according to Example 9 shows superb optical performance as a result of good corrections to various aberrations.

As described above, the present invention makes it possible to provide a lens system having high optical performance, a large aperture ratio.

Then, a camera, which is an optical apparatus equipped with the lens system according to the present embodiment, is explained. Although a case that the lens system according to Example 1 is installed is explained, the same result can be obtained by a lens system according to any other Example.

Figure 19:
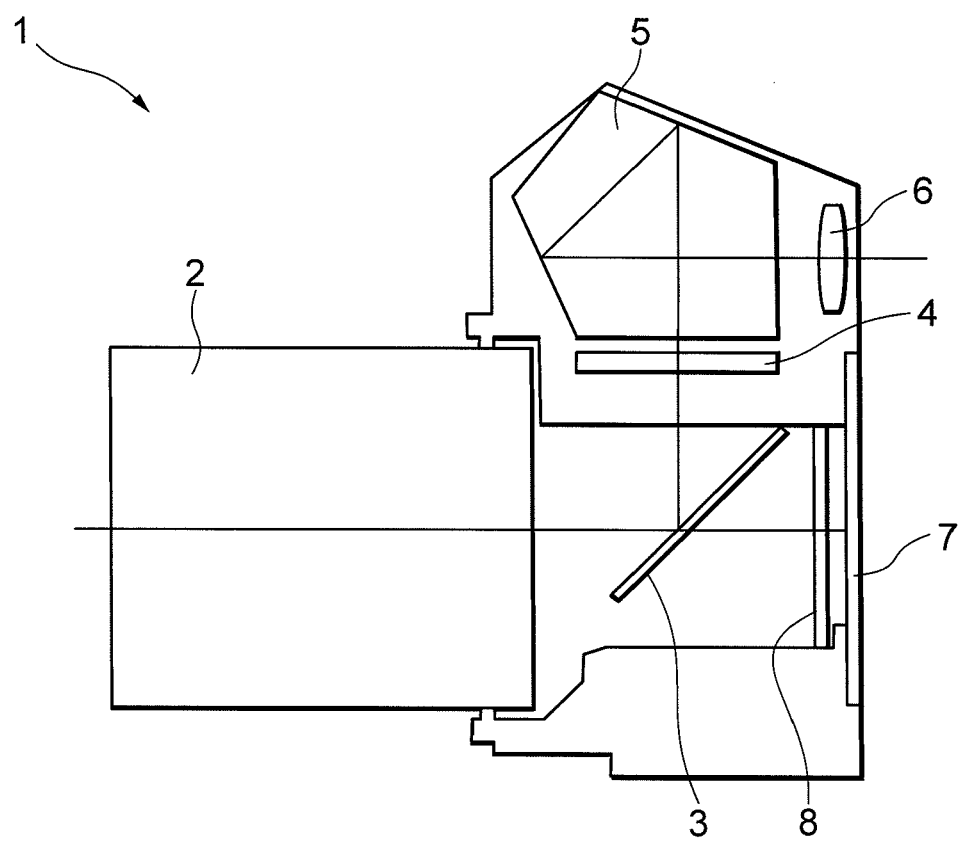
FIG. 19 is a diagram showing a construction of a camera equipped with the lens system according to Example 1.

FIG. 19 is a sectional view showing a camera equipped with the lens system according to Example 1.

In FIG. 19, the camera 1 is a single-lens reflex digital camera 1 equipped with the lens system according to Example 1 as an imaging lens 2. In the camera 1, light emitted from an unillustrated object is converged by the imaging lens 2, reflected by a quick return mirror 3, and focused on a focusing screen 4. The light focused on the focusing screen 4 is reflected a plurality of times in a pentagonal roof prism 5, and led to an eyepiece 6. Accordingly, a photographer can observe the object image as an erected image through the eyepiece 6.

When the photographer presses an unillustrated release button all the way down, the quick return mirror 3 is retracted from the optical path, a focal plane shutter 8 is also retracted from the optical path, and the light from the unillustrated object is formed an object image on an imaging device 7. Accordingly, the light emitted from the object is captured by the imaging device 7, and stored in an unillustrated memory as a photographed image of the object. In this manner, the photographer can take a picture of an object by the camera 1.

With installing the lens system according to Example 1 as an imaging lens 2 into the camera 1, it becomes possible to realize a camera having high optical performance.

Then, an outline of a method for manufacturing a lens system including, in order from an object, a fist lens group G1 and a second lens group G2 according to the present embodiment is explained below with reference to FIG. 20.

At first, a meniscus lens having a convex surface facing the object side is disposed in a sub-lens group GS12 having negative refractive power, which is disposed in a lens barrel having a cylindrical shape.

Then, the first lens group G1 and the second lens group G2 are disposed in such a manner that the first lens group G1 is constructed by a sub-lens group GS11 having positive refractive power and the sub-lens group GS12 having negative refractive power, and the second lens group G2 has positive refractive power with satisfying the following conditional expressions (1) and (2):

$$1.910 < \text{ndh} \quad (1)$$

$$-0.400 < f/f1 < 0.500 \quad (2)$$

where ndh denotes a refractive index at d-line (wavelength=587.6 nm) of a lens having the highest refractive index at d-line composing the lens system, f1 denotes a focal length of the first lens group, and f denotes a focal length of the lens system.

Moreover, an outline of a method for manufacturing a lens system including, in order from an object, a fist lens group G1 and a second lens group G2 according to the present embodiment is explained below with reference to FIG. 21.

At first, a meniscus lens having a convex surface facing the object side is disposed in a sub-lens group GS12 having negative refractive power, which is disposed in a lens barrel having a cylindrical shape.

Then, the first lens group G1 and the second lens group G2 are disposed in such a manner that the first lens group G1 is constructed by a sub-lens group GS11 having positive refractive power and the sub-lens group GS12 having negative refractive power, and the second lens group G2 has positive refractive power with satisfying the following conditional expressions (4) and (2):

$$1.820 < \text{nNh} \quad (4)$$

$$-0.400 < f/f1 < 0.500 \quad (2)$$

where nNh denotes a refractive index at d-line (wavelength=587.6 nm) of a negative lens having a high refractive index at d-line composing the lens system, f1 denotes a focal length of the first lens group, and f denotes a focal length of the lens system.

Incidentally, the following description may suitably be applied within limits that do not deteriorate optical performance.

In the above described explanations and Examples, although lens systems having a two-lens-group configuration has been shown, the above described lens configuration can be applied to other lens configurations such as a three-lens-group configuration and a four-lens-group configuration. Specifically, a lens configuration in which a positive lens group or a negative lens group is added to the most object side, and a lens configuration in which a positive lens group or a negative lens group is added to the most image side may be listed. A lens configuration that a positive lens group or a negative lens group is added between the first lens group and the second lens group can be mentioned.

In order to vary focusing from infinity to a close object, a portion of a lens group, a single lens group, or a plurality of lens groups may be moved along the optical axis as a focusing lens group. In this case, the focusing lens group can be used for auto focus, and suitable for being driven by a motor such as an ultrasonic motor. It is particularly preferable that at least a portion of the first lens group or the second lens group is moved as the focusing lens group.

Moreover, a lens group or a portion of a lens group may be moved as a vibration reduction lens group in a direction perpendicular to the optical axis thereby correcting an image blur caused by a camera shake. In particular, at least a portion of the first lens group or the second lens group is preferably made as a vibration reduction lens group.

Although an aperture stop is preferably disposed between the first lens group and the second lens group, the function may be substituted by a lens frame without disposing a member as an aperture stop.

Moreover, the lens surface of the lenses configuring the lens system may be coated with an anti-reflection film having a high transmittance in a broad wave range. With this contrivance, it is feasible to attain the high contrast and the high optical performance by reducing a flare and ghost.

The present embodiment only shows a specific example for the purpose of better understanding of the present application. Accordingly, it is needless to say that the present application in its broader aspect is not limited to the specific details and representative devices.

What is claimed is:

1. A lens system comprising, in order from an object side:
a first lens group; and
a second lens group having positive refractive power;
the first lens group including a sub-lens group having positive refractive power, and a sub-lens group having negative refractive power,
the sub-lens group having negative refractive power including a meniscus lens having a convex surface facing the object side,
the following conditional expressions being satisfied:

$$1.910 < ndh$$

$$-0.400 < f/f1 < 0.500$$

$$24.0 < vdh$$

where ndh denotes a refractive index at d-line (wavelength=587.6 nm) of a lens having the highest refractive index at d-line in the lens system, f1 denotes a focal length of the first lens group, f denotes a focal length of the lens system, and vdh denotes an Abbe number at d-line of the lens having the highest refractive index at d-line in the lens system.

2. The lens system according to claim 1, wherein the first lens group consists of the sub-lens group having positive refractive power and the sub-lens group having negative refractive power.

3. The lens system according to claim 1, wherein an aperture stop is disposed between the first lens group and the second lens group.

4. The lens system according to claim 1, wherein the sub-lens group having positive refractive power includes a positive lens element to the most object side, and an absolute value of a radius of curvature of the object side surface of the positive lens is smaller than that of the image side surface of the positive lens.

5. The lens system according to claim 1, wherein the sub-lens group having positive refractive power is composed of only positive lens elements.

6. The lens system according to claim 1, wherein the lens system includes at least one negative lens satisfying the following conditional expression:

$$1.820 < nNh$$

where nNh denotes a refractive index at d-line of the negative lens.

7. The lens system according to claim 1, wherein the most image side lens in the sub-lens group having negative refractive power is a negative lens having a concave surface facing the image side.

8. The lens system according to claim 1, wherein the second lens group includes at least one negative lens having a concave surface facing the object side, and the following conditional expression is satisfied:

$$0.300 < |r2Na|/f < 0.600$$

where r2Na denotes a radius of curvature of the object side surface of the at least one negative lens having a concave surface facing the object side.

9. The lens system according to claim 8, wherein the at least one negative lens having a concave surface facing the object side is disposed to the most object side in the second lens group.

10. The lens system according to claim 1, wherein the following conditional expression is satisfied:

$$0.800 < |r2a|/r1b < 1.200$$

where r1b denotes a radius of curvature of the most image side lens surface in the first lens group, and r2a denotes a radius of curvature of the most object side lens surface in the second lens group.

11. The lens system according to claim 1, wherein the following conditional expression is satisfied:

$$0.600 < Bf/f < 1.00$$

where Bf denotes a distance along an optical axis between the most image side lens surface of the lens system and the image plane.

12. The lens system according to claim 1, wherein a distance between the first lens group and the second lens group is always fixed.

13. An optical apparatus equipped with the lens system according to claim 1.

14. A method for manufacturing a lens system including, in order from an object side along an optical axis, a first lens group and a second lens group including steps of:
disposing a meniscus lens having a convex surface facing the object side in a sub-lens group having negative refractive power;
disposing the first lens group and the second lens group in such a manner that the first lens group consists of a sub-lens group having positive refractive power and the sub-lens group having negative refractive power, and the second lens group has positive refractive power with satisfying the following conditional expressions:

$$1.910 < ndh$$

$$-0.400 < f/f1 < 0.500$$

$$24.0 < vdh$$

where ndh denotes a refractive index at d-line (wavelength=587.6 nm) of a lens having the highest refractive index at d-line in the lens system, f1 denotes a focal length of the first lens group, f denotes a focal length of the lens system, and vdh denotes an Abbe number at d-line of the lens having the highest refractive index at d-line in the lens system.

15. The method according to claim 14, further comprising a step of:
disposing at least one negative lens satisfying the following conditional expression:

$$1.820 < nNh$$

where nNh denotes a refractive index at d-line of the negative lens.

16. The method according to claim 14, further comprising a step of:
disposing the second lens group including at least one negative lens having a concave surface facing the object side with satisfying the following conditional expression:

$$0.300 < |r2Na|/f < 0.600$$

where r2Na denotes a radius of curvature of the object side surface of the at least one negative lens having a concave surface facing the object side.

17. A lens system comprising, in order from an object side:
a first lens group; and
a second lens group having positive refractive power;
the first lens group including a sub-lens group having positive refractive power, and a sub-lens group having negative refractive power,
the sub-lens group having negative refractive power including a meniscus lens having a convex surface facing the object side,
the second lens group including at least one negative lens having a concave surface facing the object side,
the following conditional expressions being satisfied:

$$1.910 < ndh$$

$$-0.400 < f/f1 < 0.500$$

$$0.300 < |r2Na|/f < 0.600$$

where ndh denotes a refractive index at d-line (wavelength=587.6 nm) of a lens having the highest refractive index at d-line in the lens system, f1 denotes a focal length of the first lens group, f denotes a focal length of the lens system, and r2Na denotes a radius of curvature of the object side surface of the at least one negative lens having a concave surface facing the object side.

18. The lens system according to claim 17, wherein an aperture stop is disposed between the first lens group and the second lens group.

19. The lens system according to claim 17, wherein the lens system includes at least one negative lens satisfying the following conditional expression:

$$1.820 < nNh$$

where nNh denotes a refractive index at d-line of the negative lens.

20. The lens system according to claim 17, wherein the following conditional expression is satisfied:

$$0.800 < |r2a|/r1b < 1.200$$

where r1b denotes a radius of curvature of the most image side lens surface in the first lens group, and r2a denotes a radius of curvature of the most object side lens surface in the second lens group.

21. A lens system comprising, in order from an object side:
a first lens group; and
a second lens group having positive refractive power;
the first lens group including a sub-lens group having positive refractive power, and a sub-lens group having negative refractive power,
the sub-lens group having negative refractive power including a meniscus lens having a convex surface facing the object side,
the following conditional expressions being satisfied:

$$1.910 < ndh$$

$$-0.400 < f/f1 < 0.500$$

$$0.800 < |r2a|/r1b < 1.200$$

where ndh denotes a refractive index at d-line (wavelength=587.6 nm) of a lens having the highest refractive index at d-line in the lens system, f1 denotes a focal length of the first lens group, f denotes a focal length of the lens system, r1b denotes a radius of curvature of the most image side lens surface in the first lens group, and r2a denotes a radius of curvature of the most object side lens surface in the second lens group.

22. The lens system according to claim 21, wherein an aperture stop is disposed between the first lens group and the second lens group.

23. The lens system according to claim 21, wherein the lens system includes at least one negative lens satisfying the following conditional expression:

$$1.820 < nNh$$

where nNh denotes a refractive index at d-line of the negative lens.

* * * * *